United States Patent
Nath et al.

(10) Patent No.: US 9,883,430 B2
(45) Date of Patent: Jan. 30, 2018

(54) DETECTING HANDOVER FAILURES AT AN ACCESS POINT

(71) Applicant: QUALCOMM Incorporated, San Diego, CA (US)

(72) Inventors: Sudeepta Kumar Nath, Sambalpur (IN); Rajat Sapra, Hyderabad (IN); Sukhvinder Singh Malik, Sonepat (IN); Krusna Prasad Jena, Parjang (IN); Pawan Kumar Patel, Hyderabad (IN); Damanjit Singh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/171,662

(22) Filed: Jun. 2, 2016

(65) Prior Publication Data

US 2017/0353896 A1    Dec. 7, 2017

(51) Int. Cl.
*H04W 36/00* (2009.01)
*H04W 24/10* (2009.01)
*H04W 36/38* (2009.01)
*H04W 76/02* (2009.01)
*H04W 36/08* (2009.01)

(52) U.S. Cl.
CPC ....... *H04W 36/0094* (2013.01); *H04W 24/10* (2013.01); *H04W 36/08* (2013.01); *H04W 36/385* (2013.01); *H04W 76/027* (2013.01); *H04W 76/028* (2013.01)

(58) Field of Classification Search
CPC .. H04W 36/385; H04W 76/028; H04W 24/10

USPC ........ 370/332, 272; 455/436, 437, 438, 439, 455/440, 525, 63.3
See application file for complete search history.

(56) References Cited

U.S. PATENT DOCUMENTS

| | | | |
|---|---|---|---|
| 8,559,397 B2 | 10/2013 | Huang et al. | |
| 9,002,361 B2 | 4/2015 | Bergquist et al. | |
| 2013/0084874 A1 | 4/2013 | Fujishiro et al. | |
| 2013/0178204 A1 | 7/2013 | Zhang et al. | |
| 2014/0135008 A1* | 5/2014 | Yu ..................... | H04W 36/0077 455/436 |

(Continued)

FOREIGN PATENT DOCUMENTS

EP    2 981 132 A1    2/2016

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 10), 3GPP TS 36.300, V10.9.0, Jan. 7, 2013, XP050691677, 110 pages.

(Continued)

*Primary Examiner* — Inder Mehra
(74) *Attorney, Agent, or Firm* — Arent Fox LLP

(57) ABSTRACT

The present disclosure describes methods and apparatus for detecting handover failures at an AP when the AP does not have an X2 interface with at least one of its neighbors. For example, methods are provided for detecting handover failures at an AP based on at least on a UE context release command message received from a mobile management entity (MME) and/or determining that a radio resource control (RRC) connection reconfiguration (RCR) message is not delivered to the UE.

18 Claims, 16 Drawing Sheets

(56) References Cited

U.S. PATENT DOCUMENTS

| | | | | |
|---|---|---|---|---|
| 2015/0038144 A1* | 2/2015 | Ahlstrom | ............ | H04W 24/02 |
| | | | | 455/436 |
| 2015/0045028 A1 | 2/2015 | Singh et al. | | |
| 2015/0195762 A1 | 7/2015 | Watanabe et al. | | |
| 2016/0007255 A1* | 1/2016 | Sharma | ............... | H04W 36/08 |
| | | | | 370/331 |
| 2016/0192253 A1* | 6/2016 | Fischer | ................. | G08C 17/02 |
| | | | | 370/332 |
| 2016/0286442 A1* | 9/2016 | Huang | ................. | H04W 36/16 |
| 2016/0295468 A1* | 10/2016 | Zhang | .............. | H04W 36/0055 |
| 2016/0353350 A1* | 12/2016 | Engstrom | ............ | H04W 36/32 |

OTHER PUBLICATIONS

3rd Generation Partnership Project; Technical Specification Group Radio Access Network; Evolved Universal Terrestrial Radio Access Network; S1 Application Protocol (Release 13), 3GPP TS 36.413, vol. Ran WG3. No. V13.1.0, Dec. 19, 2015, XP951947144, pp. 1-314.
Partial International Search Report—PCT/US2017/033035—ISA/EPO—dated Jul. 13, 2017, 22 pages.

\* cited by examiner

DETECTING HANDOVER FAILURES AT AN ACCESS POINT

The present disclosure relates generally to communication systems, and more particularly, to a method and an apparatus for detecting handover failures at an access point (AP) or a base station.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

Wireless networks are deployed with X2 connections between neighbor base stations which are helpful in detecting handover failures between neighbor base stations. However, X2 connections may not be always present between neighbor base stations due to various reasons. For example, X2 connections may not be present between neighbor base stations as an X2 connection may not be supported by source base station or a target base station or both and/or neighbor base stations may belong to different public land mobile networks (PLMNs) or network operators, etc.

Therefore, there is a desire to detect handover failures between neighbor base stations without X2 connections.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

SUMMARY

Figure 1:
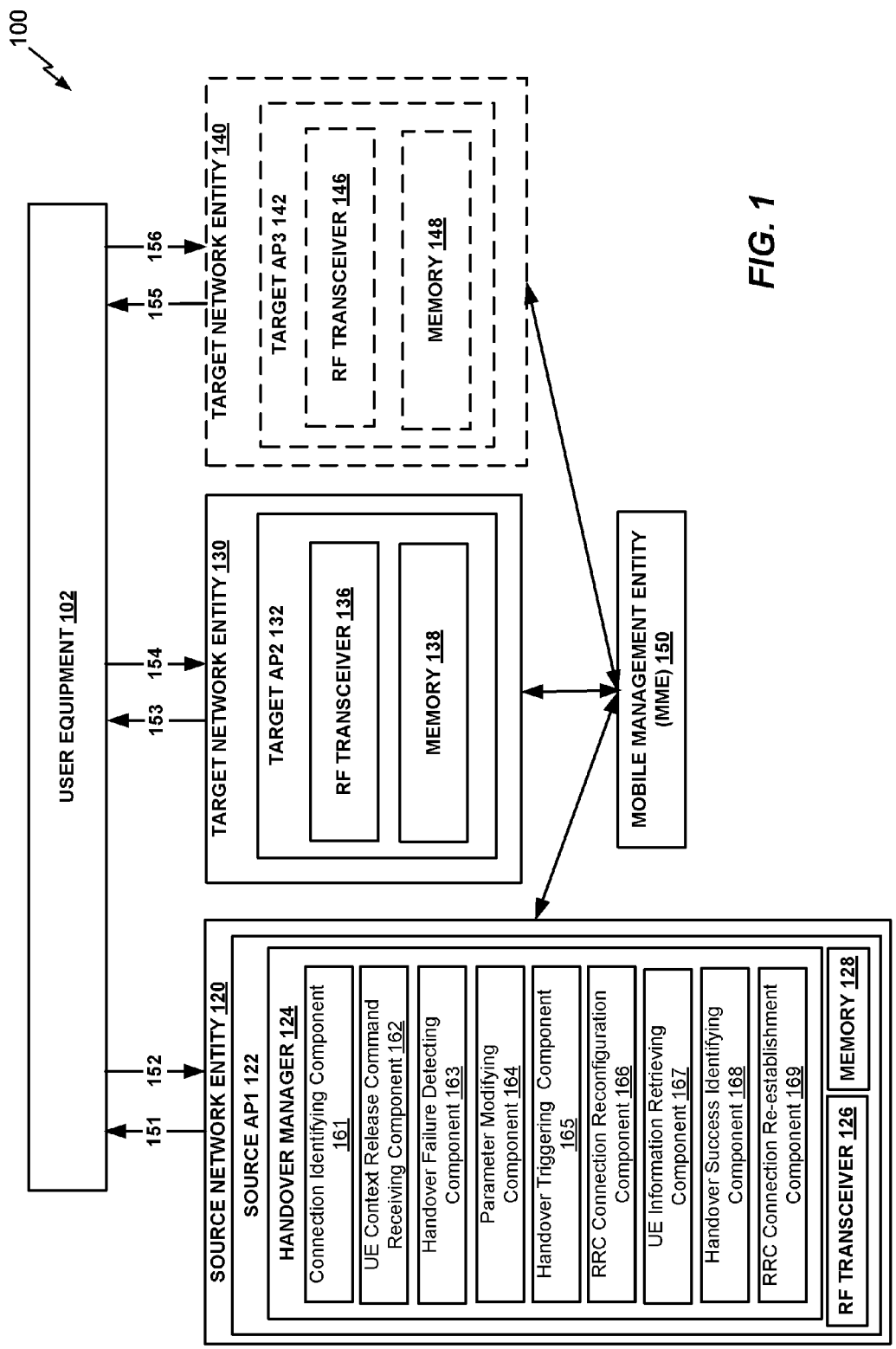
FIG. 1 is a block diagram conceptually illustrating an example of a wireless communications system, in accordance with an aspect of the present disclosure.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method, an apparatus, and a computer readable medium storing computer executable code for detecting handover failures at an access point (AP) are provided. For example, the example method at a first AP may include identifying that a user equipment (UE) is connected to the first AP and receiving a UE context release command message from a mobile management entity (MME) where the UE context release command message includes a cause value of non-access stratum (NAS) unspecified. The example method further includes detecting a handover failure of the UE from the first AP to a second AP based at least on the UE context release command message from the MME and modifying one or more parameters in response to detecting the handover failure.

In an additional aspect, a method, an apparatus, and a computer readable medium storing computer executable code for detecting handover failures at an access point (AP) are provided. For example, the example method may include identifying that a user equipment (UE) is connected to the first AP, triggering a handover of the UE from the first AP to a second AP and determining that a radio resource control (RRC) connection reconfiguration message is not delivered to the UE. The example method further includes receiving a UE context release command message with a cause value of successful handover from a mobile management entity (MME), detecting a handover failure of the UE from the first AP to the second AP based at least on the UE context release command message from the MME and the RCR message not being delivered to the UE, and modifying one or more parameters in response to detecting the handover over failure.

In a further additional aspect, a method, an apparatus, and a computer readable medium storing computer executable code for detecting handover failures at an access point (AP) are provided. For example, the example method may include identifying that a user equipment (UE) is connected to the first AP, retrieving a second cell-radio network temporary identifier (C-RNTI) assigned to the UE by the second AP, storing the second C-RNTI, a second physical cell identity (PCI) of the second AP, and a second evolved universal terrestrial access network (E-UTRAN) cell global identifier (ECGI) of the second AP, marking, at the first AP, handover of the UE as successful based at least on a C-RNTI stored at the first AP, receiving a radio resource control (RRC) connection re-establishment request message from the UE. The example method further includes determining a too early-handover of the UE to the second AP based at least on matching of the first PCI received in the RRC connection re-establishment request message with the second PCI stored at the first AP, matching of the first C-RNTI received in the RRC connection re-establishment request message with the second C-RNTI stored at the first AP, and detecting elapsed time from receiving of the UE context release command to receiving of the RRC connection re-establishment request message is less than a certain threshold, and modifying one or more parameters in response to detecting the handover failure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A small cell or a small cell base station or access point may refer, but is not limited to, a femtocell, picocell, microcell, or any other cell or base station having a relatively small transmit power or relatively small coverage area as compared to a macro cell or macro base station. The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Small cells (or access points) are generally deployed in an unplanned manner (when compared to macro cells). The unplanned deployment of small cells may affect UE's mobility and may result in handover failures. Various approaches may be used to optimize handover parameters. However, these approaches are based on handover failure messages received over X2 connections between neighbors. The present disclosure discloses methods and apparatus for detecting handover failures at APs in the absence of X2 connections between neighbors.

Handover failures at an access point may be detected as a too-late handover, a too-early handover, or a handover to a wrong cell. In general, for example, a too-late handover may described by a connection failure that occurs in a source cell before the handover is initiated or during a handover; a too-early handover may be described by a connection failure that occurs shortly after (e.g. up to fifteen seconds) a successful handover from a source cell to a target cell or during a handover; and a handover to a wrong cell may be described as a connection failure that occurs shortly after (e.g. up to fifteen seconds) a successful handover from a source cell to a target cell or during a handover. For example, a handover failure (e.g., a too-late handover) at an access point may be detected based at least on a UE context release command message received from a mobile management entity (MME). In an additional example, a handover failure (e.g., a too-late handover) at an access point may be detected based at least on a UE context release command message received from the MME and determining that a radio resource control (RRC) connection reconfiguration (RCR) message is not delivered to the UE.

In a further additional example, a handover failure (e.g., a too-early handover) at an access point may be detected based at least on matching of a physical cell identity (PCI) received in a radio resource control (RRC) connection re-establishment request message with a PCI stored at the access point, matching of a cell-radio network temporary identifier (C-RNTI) received in the connection re-establishment request message with a C-RNTI stored at the access point, and time elapsed from receiving of a UE context release command to receiving of the RRC connection re-establishment request.

Referring to FIG. 1, in an aspect, a wireless communication system 100 includes a user equipment (UE) 102 in communication with a source network entity 120, source AP1 122 and/or a handover manager 124 for managing handovers at source network entity 120 and/or source AP1 122.

UE 102 may communicate with source network entity 120 which may include one or more APs, e.g., AP1 122 (also referred to as cells, small cells, base stations, etc.) via one or more over-the-air links, e.g., a downlink (DL) 151 and/or an uplink (UL) 152. In an aspect, DL 151 is generally used for communication from source network entity 120 and/or AP1 122 to UE 102, and UL 152 is generally used for communication from UE 102 to source network entity 120 and/or source AP1 122. In an additional aspect, source network entity 120 may include a mobile management entity (MME) 150. The MME generally manages session states, authentication, paging, mobility, roaming, and/or other bearer management functions.

Further, UE 102 may communicate with target network entity 130 which may include one or more APs, e.g., AP2 132 via one or more over-the-air links, e.g., a downlink (DL) 153 and/or an uplink (UL) 154. In an aspect, DL 153 is generally used for communication from target network entity 130 and/or AP2 132 to UE 102, and UL 154 is generally used for communication from UE 102 to target network entity 130 and/or AP2 station 132. In an additional aspect, network entity 130 may include MME 150. Furthermore, UE 102 may communicate with target network entity 140 which may include one or more APs, e.g., AP3 142 via one or more over-the-air links, e.g., a downlink (DL) 155 and/or an uplink (UL) 156. In an aspect, DL 155 is generally used for communication from target network entity 140 and/or AP2 142 to UE 102 and UL 156 is generally used for communication from UE 102 to target network entity 140 and/or AP3 142. In an additional aspect, target network entity 140 may include a MME 150. Although, target AP2 132 and target AP3 142 are shown as belonging to different target network entities (e.g., network entities 130 and 140), in an aspect, target AP2 132 and target AP3 142 may belong to the same target network entity (e.g., target network entity 130 or 140). Additionally, network entities 120, 130, and/or 140 may be served by the same MME or different MMEs. It is also to be noted that APs 122, 132, and/or 142 do not have X2 connections. That is, the neighbor cells are not configured with X2 connections. Additionally, APs 122, 132, and/or 142 may include RF transceivers (126, 136, 146) and memories (128, 138, 148) for detecting handover failures at an AP.

In an aspect, for example, source network entity 120 (and/or network entities 130, 140) may include, but not limited to, an access point, a base station (BS) or Node B or eNodeB, a macro cell, a small cell (e.g., a femtocell, or a pico cell), a relay, a peer-to-peer device, an authentication, authorization and accounting (AAA) server, a mobile switching center (MSC), Mobility Management Entity (MME), SON management server, OAM server, Home NodeB Management System (HMS), Home eNodeB Management System (HeMS), etc. Additionally, source network entity 120 may include one or more of any type of network components that can enable AP1 122 communicate and/or establish and maintain links 151 and/or 152 with UE 102. In an example aspect, AP1 122 may operate according to Wideband Code Division Multiple Access (W-CDMA), Code Division Multiple Access (CDMA), Time Division Synchronous Code Division Multiple Access (TD-SCDMA), Long Term Evolution (LTE), or Global System for Mobile Communications (GSM) standard as defined in 3GPP Specifications.

In an aspect, UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In an aspect, source AP1 122 may include handover manager 124 for detecting handover failures (e.g., too late handover; target cell unprepared) at AP1 122 based on a UE context release command message received from the MME. The UE context release command message may be received from the MME with a cause value of NAS unspecified. In an additional aspect, AP1 122 may include handover manager 124 for detecting handover failures (e.g., too late handover; target cell prepared) at AP1 122 based on a UE context release command message received from the MME with a cause value of a successful handover. In a further additional aspect, AP1 122 may include handover manager 124 for detecting handover failures (e.g., too early handover) based on matching of certain parameters, e.g., physical cell identity (PCI), cell-radio network temporary identifier (C-RNTI), etc. with values assigned by target AP2 132.

In an aspect, handover manager 124 may include one or more of the following components to detect handover failures. For example, handover manager 124 may include one or more of the following components: a connection identifying component 161, a UE context release command receiving component 162, a handover failure detecting component 163, a parameter modifying component 164, a handover triggering component 165, or a RRC connection reconfiguration component 166, a UE information retrieving component 167, a handover success identifying component 168, and/or a RRC connection re-establishment component 169.

Figure 2:
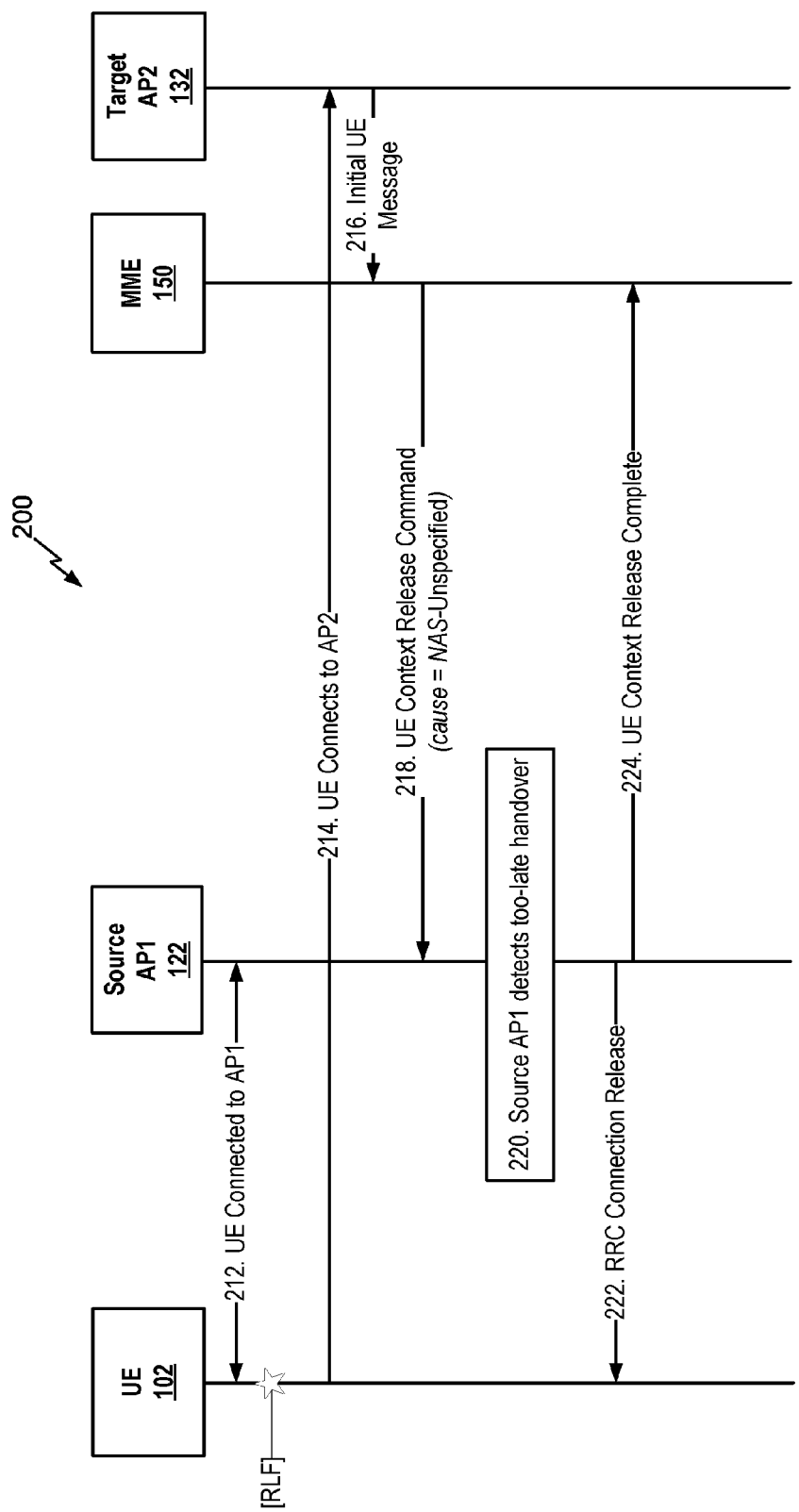
FIGS. 2-5 are message flow diagrams illustrating exchange of message between various nodes, in accordance with aspects of the present disclosure.

FIG. 2 illustrates an example aspect of a message flow diagram 200 for detecting handover failures at an access point (AP).

For instance, in an aspect, the detection of handover failure may involve target cell (e.g., target AP2 132) which is unprepared for the handover of UE 102 from source cell AP1 122. Although the operations in FIG. 2 are illustrated and/or described in a sequence, the messages associated with the operations may be sent/received in no particular order unless they are clearly described, e.g., due to a dependency, in response to, etc.

In an aspect, at operation 212, source AP1 122 detects that UE 102 is connected to the source AP1 122. For instance, source AP1 122 may detect that UE 102 is connected to AP1 122 based on an active RRC connection or a UE context of UE 102 saved at source AP1 122 when the UE is in a connected mode. In an aspect, after UE 102 is connected to source AP1 122, UE 102 may encounter (e.g., experience) a radio link failure (RLF) due to various reasons, e.g., mobility.

At operation 214, UE 102 may connect to AP2 (e.g., target AP2 132). For instance, once UE 102 encounters the RLF, UE 102 may search for cells to connect and may connect to target AP2 132. At operation 216, target AP2 132 may send an "initial UE message" to MME 150. For instance, when target AP2 132 receives the first uplink (UL) non-access stratum (NAS) message from UE 102 which is transmitted on a RRC connection, target AP2 132 invokes the NAS transport procedure and sends the initial UE message to MME 150. A NAS message manages a connection between a UE and core network (e.g., MME) as the UE moves.

At operation 218, MME 150 initiates a UE context release procedure by sending an "UE context release command message" to source AP 122. For instance, the UE context release command message contains UE S1AP ID pair information element (IE) or MME UE S1AP IE. In an aspect, the UE context release command message may be sent to source AP1 122 with a cause value of NAS unspecified (e.g., cause unspecified). That is, the cause value is not a "normal release." For instance, in an aspect, the cause value of NAS unspecified may indicate to source AP1 122 that UE 102 likely encountered (e.g., experience) a RLF and then tried to connect to a cell (e.g., target cell AP2 132). The NAS cause code (e.g., unspecified) may be provided by a protocol (e.g., S1-AP) between the UE and MME.

At operation 220, source AP1 122 detects a handover failure, e.g., a too-late handover of the 102 from source AP1 122 to target AP2 132, based on the UE context release command message with a cause value of NAS unspecified received at operation 218. At operation 222, source AP1 122 may send a RRC connection release message to UE 102 to command the UE to release the RRC connection with source AP1 122. At operation 224, source AP1 122, upon receiving the UE context release command message (at operation 218), releases all related signaling and user data transport resources and sends a UE context release complete message to MME 150.

Figure 3:
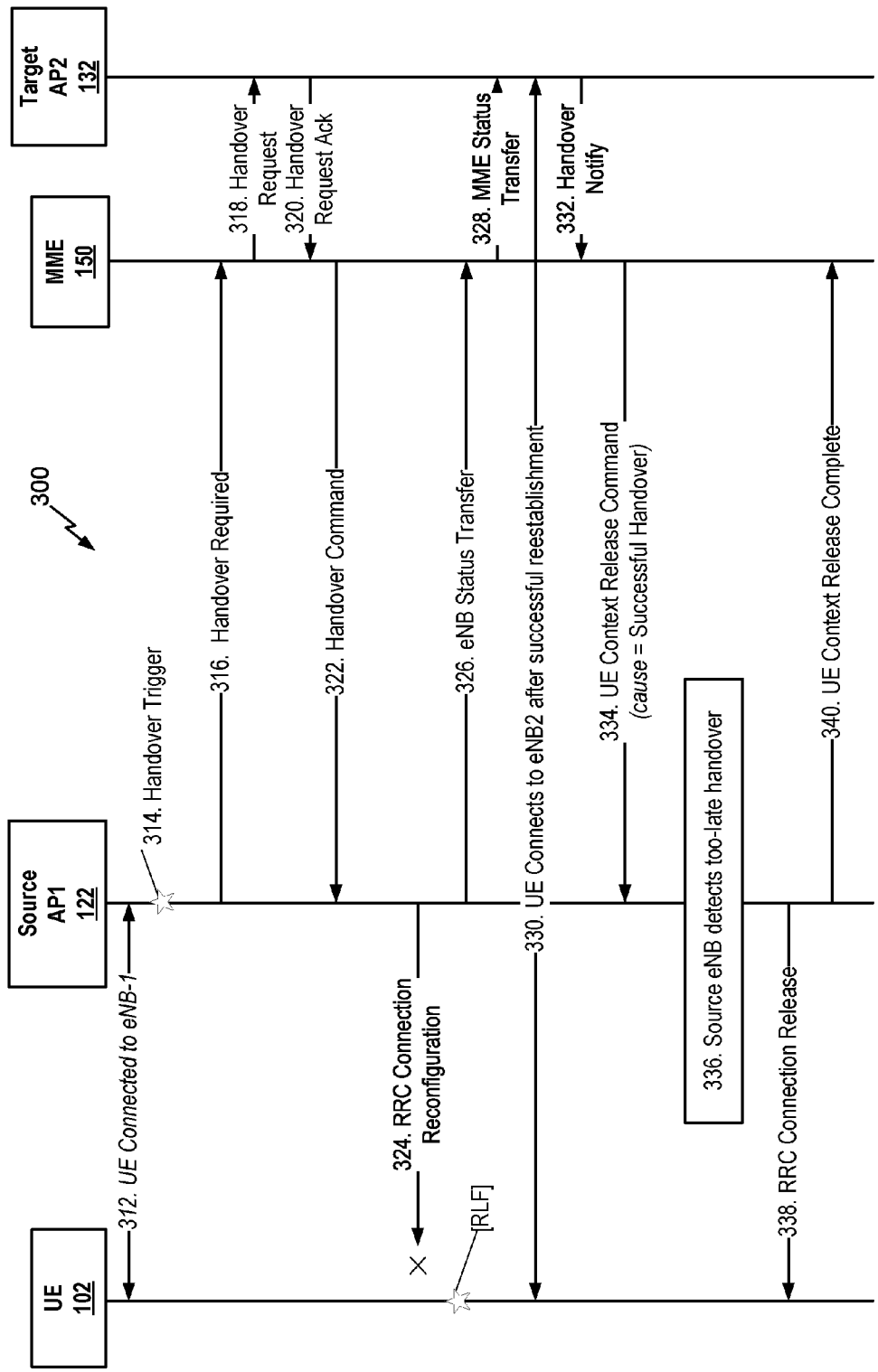

FIG. 3 illustrates an example aspect of a message flow diagram 300 for detecting handover failures at an access point (AP).

For instance, in an aspect, the detection of handover failure may involve target cell (e.g., target AP2 132) which is prepared for the handover of UE 102 from source cell AP1 122. Although the operations in FIG. 3 are illustrated and/or described in a sequence, the messages associated with the operations may be sent/received in no particular order unless they are clearly described above, e.g., due to a dependency, in response to, etc.

In an aspect, at operation 312, source AP1 122 detects that UE 102 is connected to source AP1 122. For instance, source AP1 122 may detect that UE 102 is connected to AP1 122 based on an active RRC connection or a UE context of UE 102 saved at source AP1 122 when the UE is in a connected mode.

At operation 314, a handover of UE 102 may be triggered at AP1 122 to handover UE 102 from source AP1 122 to target AP2 132. For instance, in an aspect, the handover of the UE may be triggered based on measurement report messages (MRMs) received from the UE which may include reference signal received power (RSRP) and/or reference signal received quality (RSRQ) values which are generally used for triggering handovers.

At operation 316, once the handover of UE 102 is triggered at source AP1 122, source AP1 122 initiates the handover preparation by sending a "handover required" message to a serving MME, e.g., MME 150. In an additional aspect, the source AP1 122 may include a "source to target transparent container IE" in the handover required message.

At operation 318, MME 150 initiates a handover resource allocation procedure by sending a "handover request" message to target AP2 132. In an aspect, the handover request message may contain the handover restriction list IE which may contain roaming or access restrictions. At operation 320, target AP2 132 may send a "handover request acknowledgement" message to MME 150 in response to receiving the handover request message from MME 150.

At operation 322, when the preparation, including the reservation of resources at the target AP2 132 is ready, MME 150 may send a "handover command" message to source AP1 122. In an aspect, if the target to source transparent container IE was received by MME 150 from the handover target (e.g., target AP2 132), the transparent container is included in the handover command message sent to source AP1 122.

At operation 324, source AP1 122 may send a "RRC connection reconfiguration message," e.g., RCR message, to UE 102. However, UE 102 may not have received the RRC connection reconfiguration message as UE 102 may have encountered (e.g., experienced) a RLF. In an aspect, UE 102 may have encountered a radio link failure (RLF) due to various reasons, e.g., mobility.

At operation 326, source AP1 122 may send an "eNB status transfer" message to MME 150. For instance, the eNB status transfer procedure transfers uplink packet data convergence protocol-sequence number (PDCP-SN) and hyper frame number (HFN) receiver status and downlink PDCP-SN and HFN transmitter status from source AP1 122 to target AP2 132 via MME 150 during an intra LTE S1 handover for each respective E-RAB for which PDCP-SN and HFN status preservation applies. At operation 328, MME 150 initiates "MME status transfer" procedure by sending MME status transfer message to target AP2 132. In an aspect, the MME status transfer procedure may transfer the uplink PDCP-SN and HFN receiver status and the downlink PDCP-SN and HFN transmitter status from the source eNB (e.g., source AP1 122) to the target eNB (e.g., target AP2 132) via MME 150 during a S1 handover for each respective radio access bearer (RAB) for which PDCP-SN and HFN status preservation applies.

At operation 330, UE 102 connects to target AP2 132 after successful reestablishment. At operation 332, target AP2 132 sends a "handover notify" message to MME 150. For example, in an aspect, target AP2 132 may send the handover notify message to MME 150 when the UE has been identified in the target AP and the S1 handover has been successfully completed.

At operation 334, MME 150 may send an "UE context release command" message to source AP1 122. MME 150 may initiate the procedure by sending the UE context release command message to the source AP1 122. For instance, in an aspect, the UE context release command message may be sent with a cause value of successful handover.

At operation 336, source AP1 122 may detect a handover failure (e.g., a too-late handover) of UE 102 from source AP1 122 to target AP2 132 based on the UE context release command received from MME 150 at operation 334. At operation 338, source AP1 122 may send a "RRC connection release" message to UE 102 to command UE 102 to release the RRC connection with source AP1 122. At operation 340, source AP1 122, upon receiving the UE context release command message (at operation 334), releases all related signaling and user data transport resources and responds with a UE context release complete message to MME 150.

Figure 4:
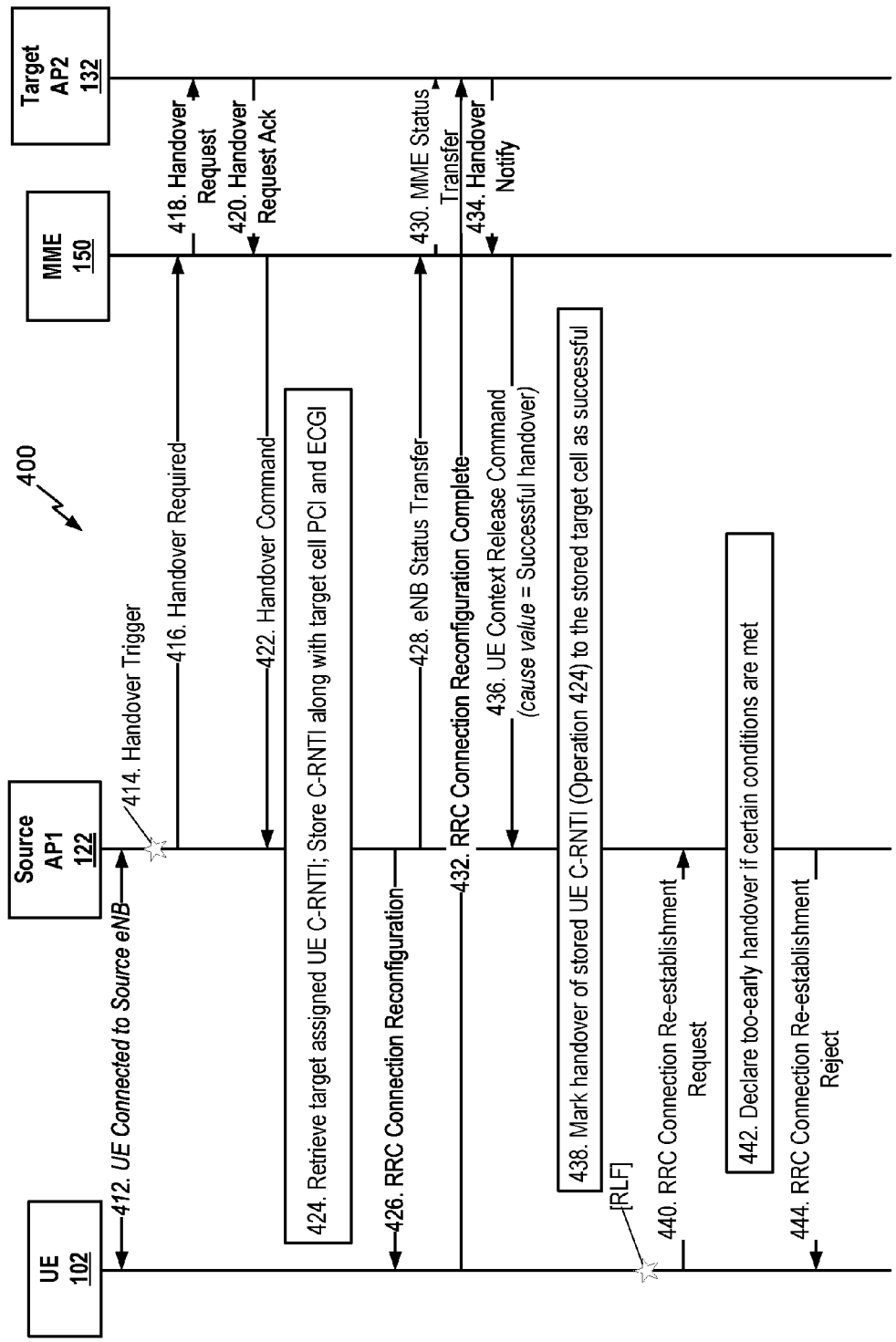

FIG. 4 illustrates an example aspect of a message flow diagram 400 for detecting handover failures at an access point (AP). Although the operations in FIG. 4 are illustrated and/or described in a sequence, the messages associated with the operations may be sent/received in no particular order unless they are clearly described, e.g., due to a dependency, in response to, etc.

In an aspect, at operation 412, source AP1 122 detects that UE 102 is connected to source AP1 132. For instance, source AP1 122 may detect that UE 102 is connected to AP1 122 based on an active RRC connection or a UE context of UE 102 saved at source AP1 122 when the UE is in a connected mode.

At operation 414, a handover may be triggered at AP1 122 to handover UE 102 from source AP1 122 to target AP2 132. At operation 314, a handover of UE 102 may be triggered at AP1 122 to handover UE 102 from source AP1 122 to target AP2 132. For instance, in an aspect, the handover of the UE may be triggered based on measurement report messages (MRMs) received from the UE which may include reference signal received power (RSRP) and/or reference signal received quality (RSRQ) values which are generally used for triggering handovers. In an additional aspect, for example, AP1 122 may determine that the handover of UE 102 was not triggered due to a coverage gap when at least one RSRP measurement is equal or above (e.g., satisfies) a threshold value. Further, a hysteresis may be used as well (i.e., at least one RSRP measurement for a defined period of time).

At operation 416, after the handover is triggered at source AP1 122, source AP1 122 initiates the handover preparation by sending a "handover required" message to a serving MME, e.g., MME 150. In an additional aspect, source AP1 122 may include a "source to target transparent container IE" in the handover required message. At operation 418, MME 150 initiates the handover resource allocation procedure by sending a "handover request" message to target AP2 132. In an aspect, the handover request message may contain the handover restriction list IE which contains roaming or access restrictions. At operation 420, target AP2 132 may send a handover request acknowledgement message to MME 150 in response to receiving the handover request message from MME 150.

At operation 422, when the preparation, including the reservation of resources at the target AP2 132 is ready, MME 150 responds with a "handover command" message to the source AP1 122. If the target to source transparent container IE was received by MME 150 from target AP2 132, then the transparent container may also be included in the handover command message to source AP1 122.

At operation 424, source AP1 122 may retrieve "target eNB to source eNB transparent container" IE from the handover command message received at operation 422. In an aspect, source AP1 122 may retrieve cell-radio network temporary identifier (C-RNTI) assigned to UE 102 by target AP2 132 and may store the retrieved C-RNTI of the UE. In an additional aspect, source AP1 122 may also retrieve and store physical cell identifier (PCI) and/or evolved universal terrestrial access network (E-UTRAN) cell global identifier (ECGI) of target AP2 132.

At operation 426, source AP1 122 may send a RRC connection reconfiguration (RCR) message to UE 102. The RCR message is a command to modify a RRC connection. For example, RRC connection reconfiguration may establish, modify, and release radio bearers; perform handovers; setup, modify, and release measurements; add, modify, and release SCells; and transfer dedicated NAS Information from eNodeB to UE.

At operation 428, source AP1 122 may send an "eNB status transfer" message to MME 150. At operation 430, MME 150 initiates "MME status transfer" procedure by sending the MME status transfer message to target AP2 132. At operation 432, UE 102 may send a "RRC connection reconfiguration complete" message to target AP2 132. At operation 434, target AP2 132 sends a "handover notify" message to MME 150. For example, in an aspect, target AP2 132 may send the handover notify message to MME 150 when the UE was identified in the target AP 132 and the S1 handover has been successfully completed.

At operation 436, MME 150 may send an "UE context release command" message to source AP1 122. The MME initiates the procedure by sending the UE context release command message to the source AP1 122. In an aspect, for example, the UE context release command message may be sent with a cause value of successful handover as the UE was identified in the target AP 132 and the S1 handover was successfully completed.

At operation 438, source AP1 122 may mark the handover of UE (UE C-RNTI stored at operation 424) to the target cell (e.g., target AP2 132) as successful if the UE context release command received at operation 436 is received with a cause value of successful handover. After source AP1 122 marks the handover of the UE (e.g., stored UE C-RNTI) to the stored target cell (e.g., target AP2 132) as successful, UE 102 may encounter (e.g., experience) a RLF, for example, due to mobility.

At operation 440, UE 102 may send a "RRC connection re-establishment" request to source AP1 122. The RRC connection re-establishment procedure is to re-establish a RRC connection. For example, in an aspect, a UE in RRC_CONNECTED state may initiate the procedure after having detected radio link failure in order to continue the RRC connection either in the source or in another cell. The connection re-establishment succeeds only if the concerned cell is prepared. In an aspect, UE 102 may include C-RNTI of the UE, target cell PCI, and reestablishment cause=other in the RRC connection re-establishment request.

At operation 442, source AP1 122 may determine that a handover failure occurred (e.g., a too-early handover) if the following conditions are met: target cell PCI received at operation 440 (in the RRC connection re-establishment request) matches target cell PCI stored at operations 424 and 438; UE C-RNTI received at operation 440 matches with UE C-RNTI stored at operations 424 and 438; and time elapsed between operations 436 and 440 is below a certain threshold. In an aspect, the threshold value may be defined by the network operator. At operation 444, source AP1 122 sends a RRC connection re-establishment request message after detecting the handover failure, e.g., too early handover.

Figure 5:
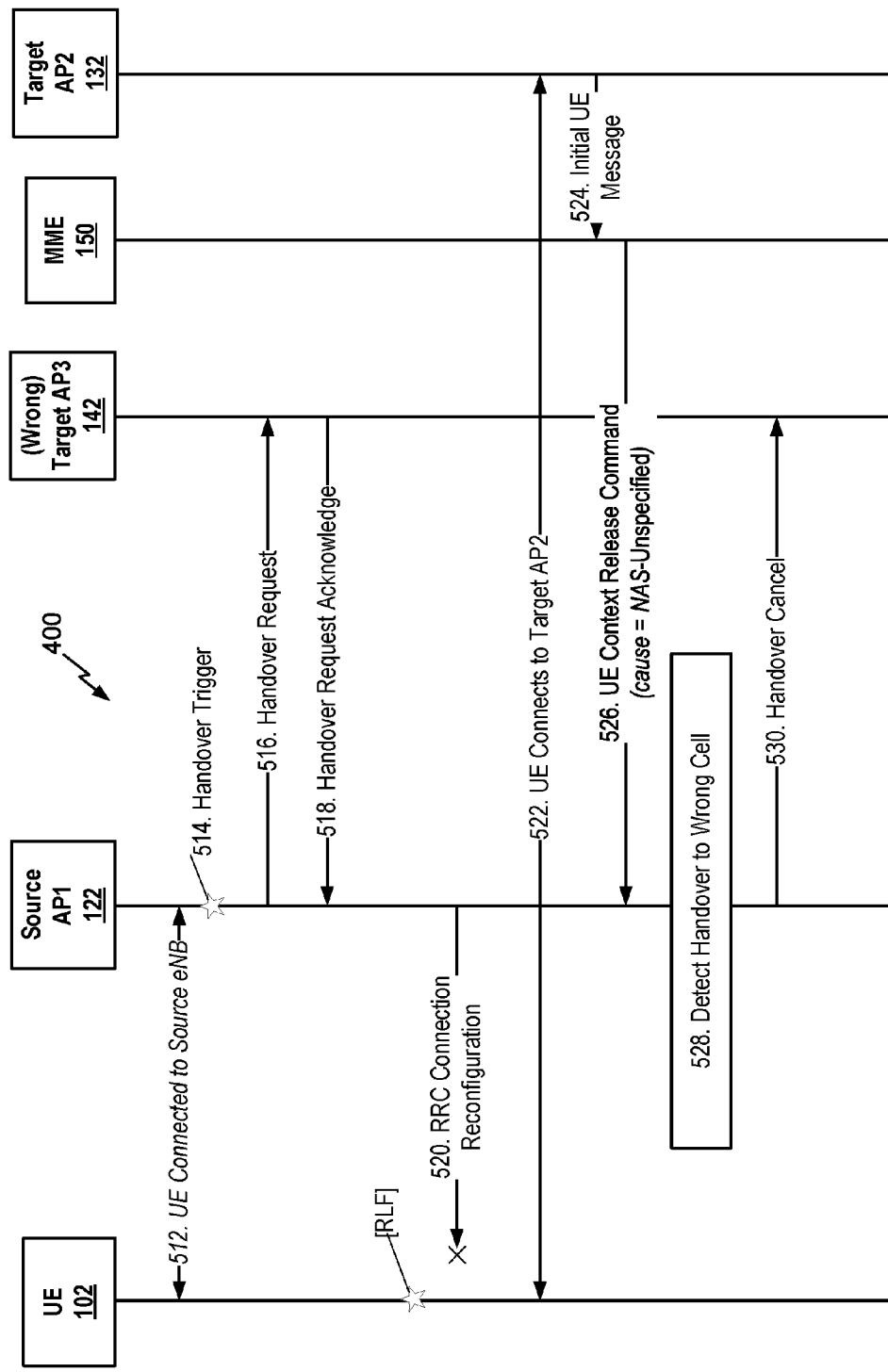

FIG. 5 illustrates an example aspect of a message flow diagram 500 for detecting handover failures at an access point (AP). Although the operations in FIG. 5 are illustrated and/or described in a sequence, the messages associated with the operations may be sent/received in no particular order unless they are clearly described, e.g., due to a dependency, in response to, etc.

In an aspect, at operation 512, source AP1 122 detects that UE 102 is connected to the source AP1. For instance, source AP1 122 may detect that UE 102 is connected to AP1 122 based on an active RRC connection or a UE context of UE 102 saved at source AP1 122 when the UE is in a connected mode.

At operation 514, a handover may be triggered at AP1 122 to handover UE 102 from source AP1 122 to target AP2 132. For instance, in an aspect, the handover of the UE may be triggered based on MRMs received from the UE which may include RSRP and/or RSRQ values. At operation 516, source AP1 122 may send a "handover request" message to an AP, e.g., AP3 142 which may be the wrong target AP. At operation 518, the wrong target AP, e.g., AP3 142 may send a "handover request acknowledge message" to source AP1 122. After the source AP1 122 receives the handover requests acknowledge message from AP3 132, the UE may encounter (e.g., experience) a radio link failure (RLF) due to various reasons, e.g., mobility.

At operation 520, source AP1 122 may send a "RRC connection reconfiguration" message to UE 102. The RRC connection reconfiguration message is a command to modify a RRC connection, as described above. However, the RRC connection reconfiguration message may not be delivered to UE 102 as the UE may have encountered a RLF (i.e., no RRC connection between UE 102 and source AP1 122).

At operation 522, UE 102 connects to the correct target AP, e.g., target AP2 132. For instance, in an aspect, UE 102 may search for cells after the RLF and may connect to AP2 132. At operation 524, target AP2 132 may send an "initial UE message" to MME 150. For instance, when target AP2 132 receives the first uplink (UL) non-access stratum (NAS) message transmitted on a RRC connection to be forwarded to MME 206, target AP2 132 invokes the NAS transport procedure and sends the initial UE message to MME 150.

At operation 526, MME 150 may initiate a UE context release procedure by sending a "UE context release command message" to source AP 122. In an aspect, UE context release command message may be sent to source AP 122 with a cause value of NAS unspecified. At operation 528, source AP1 122 may detect a handover failure, e.g., handover to a wrong AP. For instance, in an aspect, source AP1 122 may detect a handover to the wrong cell as handover preparations for UE 102 were made at target AP3 142 but source AP1 122 received UE context release command message for the UE over the S1 interface from MME with a cause value of NAS unspecified. At operation 520, source AP1 122 may cancel the handover by sending a "handover cancel" message to target AP2 142.

Figure 6:
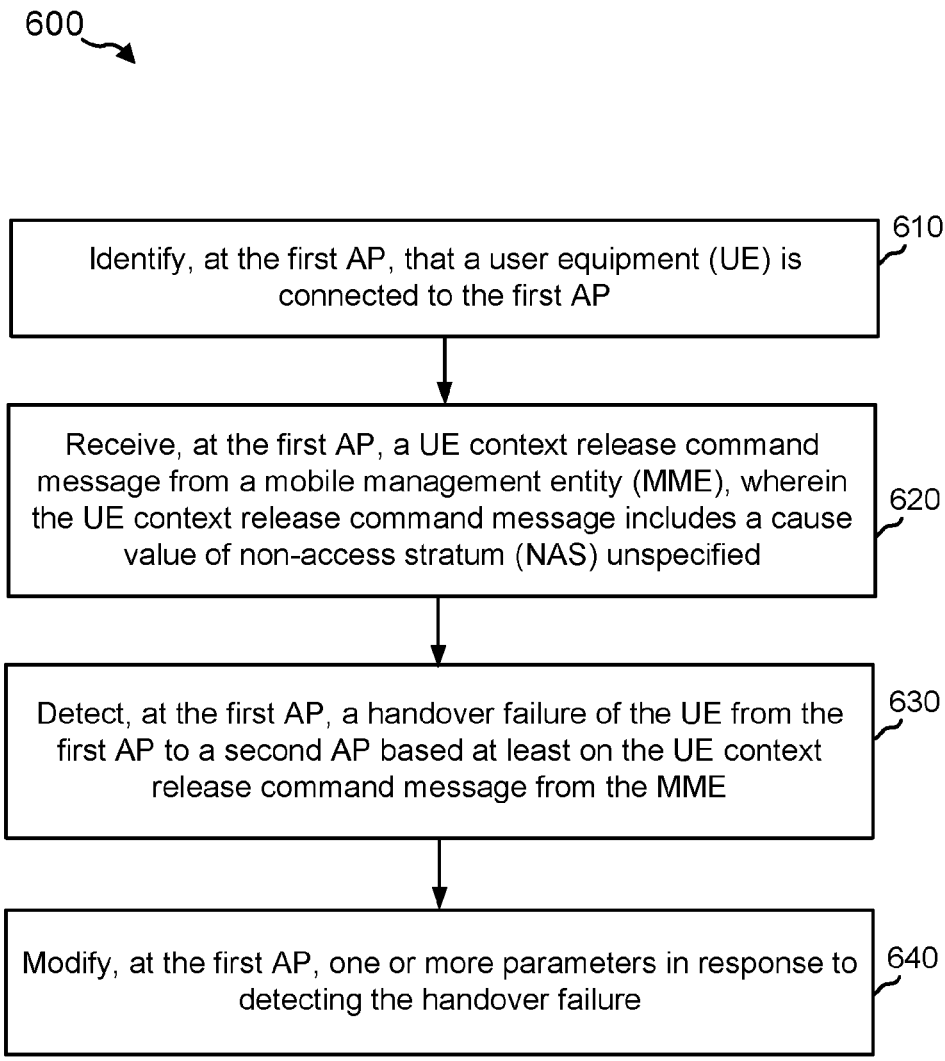
FIGS. 6-8 are flowcharts illustrating methods for detecting handover failures at a base station, in accordance with aspects of the present disclosure.

FIG. 6 is a flowchart illustrating a method 600 for detecting a handover failure at an AP.

In an aspect, at block 610, methodology 600 may include identifying, at the first AP, that a user equipment (UE) is connected to the first AP. For example, in an aspect source AP1 122 and/or handover manager 124 may include a specially programmed processor module, or a processor executing specially programmed code stored in a memory to identify UE 102 is connected to source AP1 122. As described above in reference to operation 212 of FIG. 2, for example, source AP1 122 may detect that UE is connected to AP1 122 based on an active RRC connection or a UE context saved at source AP1 122 when the UE is in a connected mode. In an aspect, handover manager 124 may include a connection identifying component 161 to perform this function.

In an aspect, at block 620, methodology 600 may include receiving, at the first AP, a UE context release command message from a mobile management entity (MME), wherein the UE context release command message includes a cause value of non-access stratum (NAS) unspecified. For example, in an aspect source AP1 122 and/or handover manager 124 may include a specially programmed processor module, or a processor executing specially programmed code stored in a memory to receive a UE context release command message from MME 150. The UE context release command message may include a cause value of NAS unspecified. For instance, in an aspect, the cause value of NAS unspecified may indicate to source AP1 122 that UE 102 likely encountered a RLF and then tried to connect to a cell (e.g., target cell AP2 132). In an aspect, handover manager 124 may include a UE context release command receiving component 162 to perform this function.

In an aspect, at block 630, methodology 600 may include detecting, at the first AP, a handover failure of the UE from the first AP to a second AP based at least on the UE context release command message from the MME. For example, in an aspect source AP1 122 and/or handover manager 124 may include a specially programmed processor module, or a processor executing specially programmed code stored in a memory, to detect a handover failure of UE 102 from AP1 122 to AP2 132 based at least on receiving the UE context release command message (e.g., with a cause value of NAS unspecified) from MME 150, as described above in reference to operation 220 of FIG. 2. In an aspect, handover manager 124 may include a handover failure detecting component 163 to perform this function.

In an aspect, at block 640, methodology 600 may modify, at the first AP, one or more parameters in response to detecting the handover failure. For example, in an aspect source AP1 122 and/or handover manager 124 may include a specially programmed processor module, or a processor executing specially programmed code stored in a memory, to modify one or more parameters in response to detecting the handover failure.

For example, in an aspect, AP1 122 and/or handover manager 124 may modify mobility parameters to reduce (e.g., minimize, avoid, etc.) handover failures. In an aspect, AP1 122 may modify (e.g., reduce the values) mobility parameters, e.g., a3-offset, TimeToTrigger (TTT), event thresholds (e.g., A5Threshold1/2, frequency offset, cell individual offset (CIO), etc. In an additional aspect, AP1 122 and/or handover manager 124 may change transmit power of AP1 122, change operating channel or frequency of AP1 122 to a different channel or a frequency. In a further additional or optional aspect, AP1 122 and/or handover manager 124 may identify certain neighbor APs as not a good handover candidate. In other words, AP1 122 may blacklist some neighbor APs as not being suitable for handovers. In an aspect, handover manager 124 may include a parameter modifying component 164 to perform this function. Thus, handover failures may be detected and managed at AP1 122.

Figure 7:
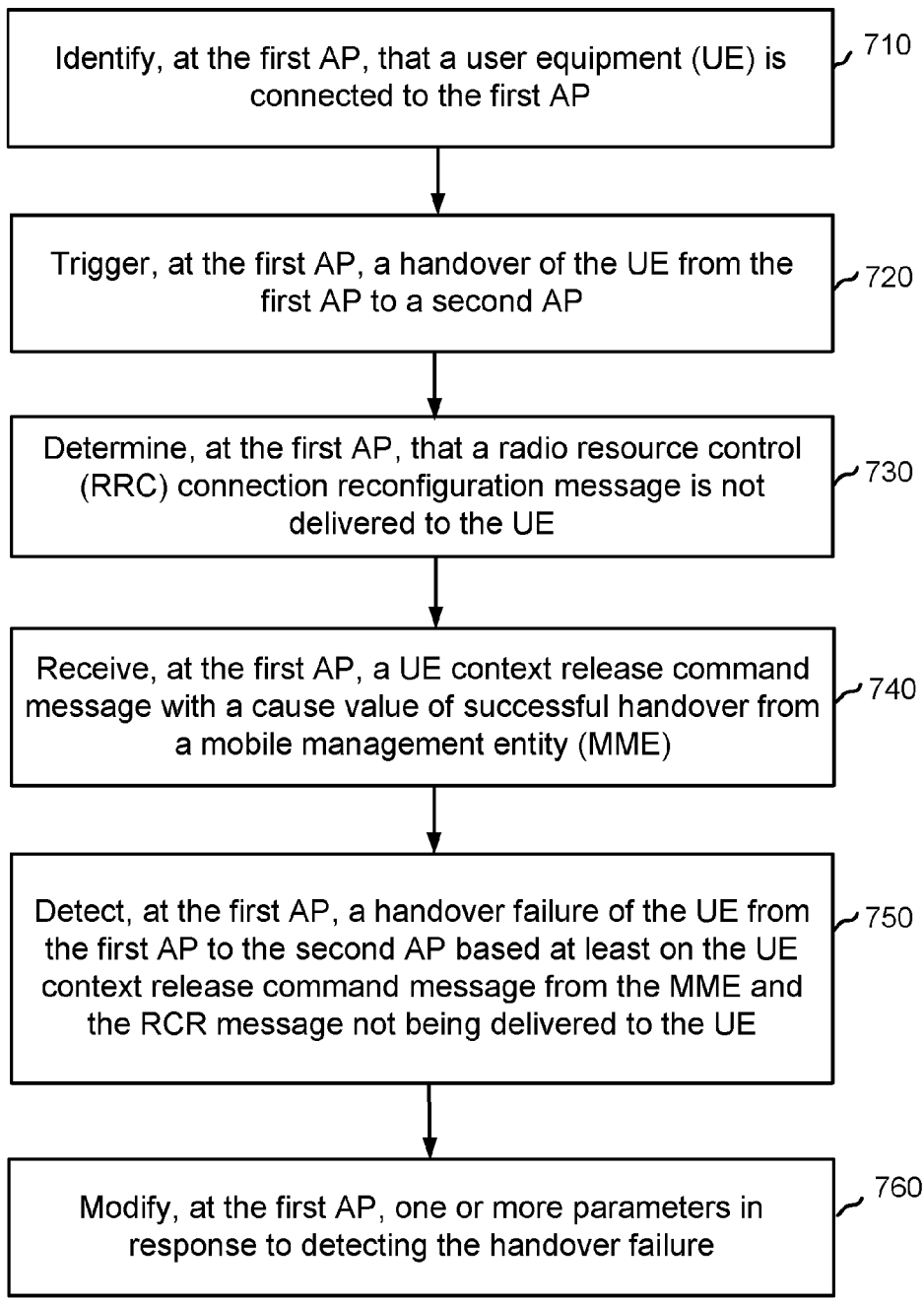

FIG. 7 is a flowchart illustrating a method 700 for detecting a handover failure at an AP.

In an aspect, at block 710, methodology 700 may include identifying, at the first AP, that a user equipment (UE) is connected to the first AP. For example, in an aspect, source AP1 122 and/or handover manager 124 may include a specially programmed processor module, or a processor executing specially programmed code stored in a memory, to identify that UE 102 is connected to source AP1 122. As described above in reference to operation 312 of FIG. 3, for example, source AP1 122 may detect that UE 102 is connected to AP1 122 based on an active RRC connection or a UE context saved at source AP1 122 when the UE is in a connected mode. In an aspect, handover manager 124 may include connection identifying component 161 to perform this function.

In an aspect, at block 720, methodology 700 may include triggering, at the first AP, a handover of the UE from the first AP to a second AP. For example, in an aspect source AP1 122 and/or handover manager 124 may include a specially programmed processor module, or a processor executing specially programmed code stored in a memory, to trigger a handover of UE 102 from source AP1 122 to target AP2 132. For instance, the handover may be triggered by source AP1 122 based on MRMs received from UE 102 which may include RSRP and/or RSRQ values. In an aspect, handover manager 124 may include a handover triggering component 165 to perform this function.

In an aspect, at block 730, methodology 700 may include determining, at the first AP, that a radio resource control (RRC) connection reconfiguration (RCR) message is not delivered to the UE. For example, in an aspect source AP1 122 and/or handover manager 124 may include a specially programmed processor module, or a processor executing specially programmed code stored in a memory, to determine that a RCR message is not delivered to the UE. As described above in reference to 324 of FIG. 3, the RCR message may not have been delivered to UE 102 due to various reasons, for example, UE 102 may have encountered a RLF (e.g., due to mobility). In an aspect, handover manager 124 may include a RRC connection reconfiguration component 166 to perform this function.

In an additional or optional aspect, source AP1 122 and/or handover manager 124 may detect that the RRC connection reconfiguration message is not delivered to UE 102 based at least on determining that a corresponding uplink (UL) acknowledgement (ACK) message is not received for the RRC connection reconfiguration message transmitted to the UE, identifying that the source AP1 122 stopped receiving messages or signals from the UE, and/or determining that the RRC connection reconfiguration message is not delivered to the UE when a delay between a last known time the UE was connected to the source AP1 122 and a time when the UE context release command with successful handover is received at the source AP1 122 is above a threshold value.

In an aspect, at block 740, methodology 700 may include receiving, at the first AP, a user equipment (UE) context release command message with a cause value of successful handover from a mobile management entity (MME). For example, in an aspect source AP1 122 and/or handover manager 124 may include a specially programmed processor module, or a processor executing specially programmed code stored in a memory, to receive UE context release command message with a cause value of successful handover from MME 150. That is, the handover of UE 102 initiated at source AP1 122 at operation 314 is considered successful. In an aspect, handover manager 124 may include UE context release command receiving component 162 to perform this function.

In an aspect, at block 750, methodology 700 may include detecting, at the first AP, a handover failure of the UE from the first AP to the second AP based at least on the UE context release command message from the MME and the RCR message not being delivered to the UE. For example, in an aspect source AP1 122 and/or handover manager 124 may include a specially programmed processor module, or a processor executing specially programmed code stored in a memory, to detect a handover failure of UE 102 from source AP1 122 to target AP2 132 based at least on the UE context release command message from the MME, as described above in reference to operation 336 of FIG. 3. In an aspect, handover manager 124 may include handover failure detecting component 163 to perform this function.

In an aspect, at block 760, methodology 700 may include modifying, at the first AP, one or more parameters in response to detecting the handover over failure. For example, in an aspect source AP1 122 and/or handover manager 124 may include a specially programmed processor module, or a processor executing specially programmed code stored in a memory, to modify one or more parameters in response to detecting the handover over failure. In an aspect, handover manager 124 may include parameter modifying component 164 to perform this function.

In an aspect, AP1 122 and/or handover manager 124 may modify mobility parameters to reduce (e.g., minimize, avoid, etc.) handover failures. In an aspect, AP1 122 may modify (e.g., reduce) mobility parameters, e.g., a3-offset, TimeToTrigger (TTT), event thresholds (e.g., A5Threshold1/2, frequency offset, cell individual offset (CIO), etc. In an additional aspect, source AP1 122 and/or handover manager 124 may change transmit power of AP1 122 or operating channel or frequency of AP1 122 to a different channel or frequency. In a further additional or optional aspect, AP1 122 and/or handover manager 124 may tag (e.g., identify) certain neighbor APs as not a good handover candidate. In other words, AP1 122 may blacklist some neighbor APs as not suitable for handovers. In an aspect, handover manager 124 may include a connection identifying component 161 to perform this function. Thus, handover failures may be detected and managed at AP1 122.

Figure 8:
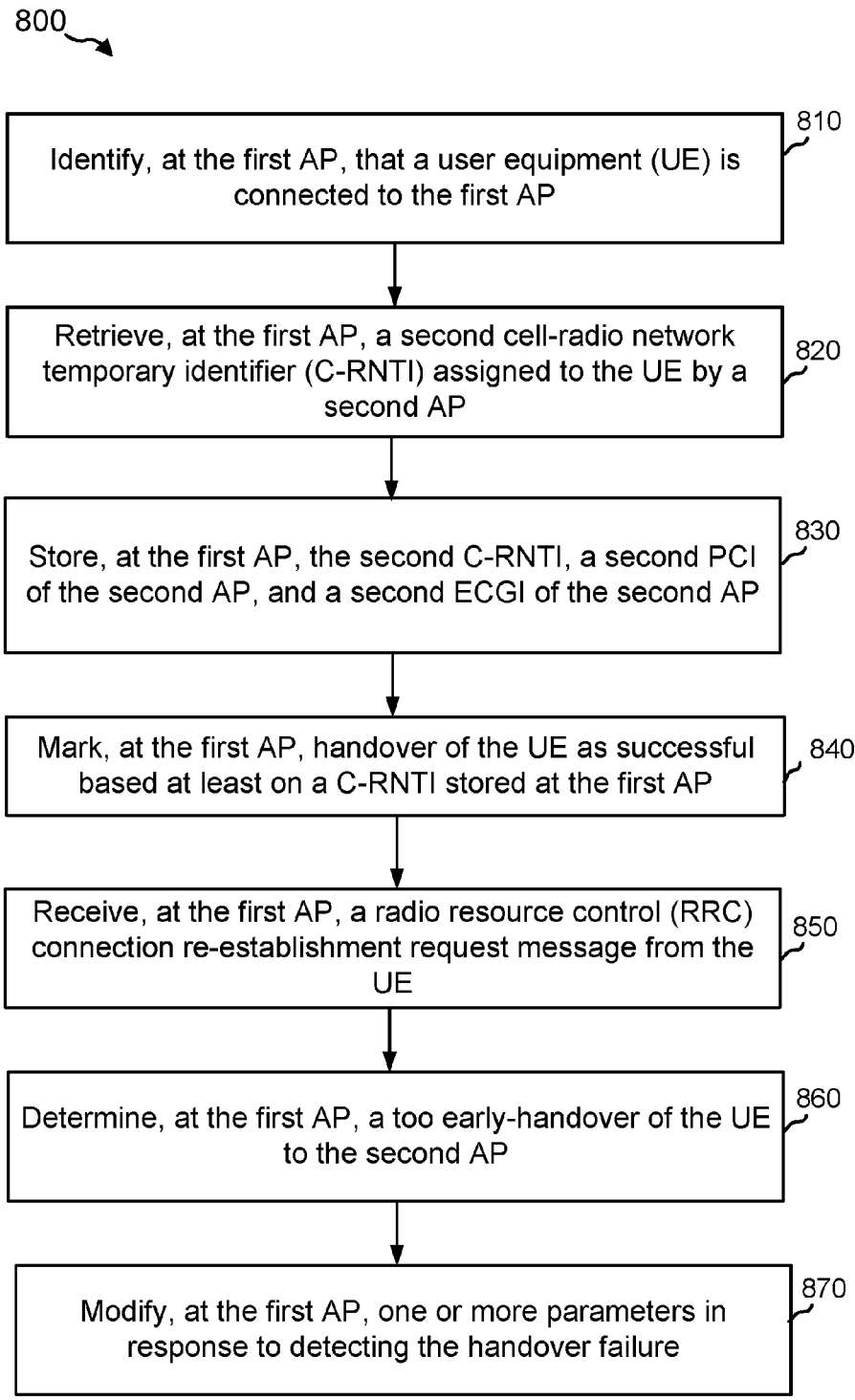

FIG. 8 is a flowchart illustrating a method 800 for detecting a handover failure at an AP.

In an aspect, at block 810, methodology 800 may include identifying, at the first AP, that a user equipment (UE) is connected to the first AP. For example, in an aspect source AP1 122 and/or handover manager 124 may include a specially programmed processor module, or a processor executing specially programmed code stored in a memory, to identify that UE 102 is connected to source AP1 122. As described above in reference to operation 412 of FIG. 4, for example, source AP1 122 may detect that UE 102 is connected to AP1 122 based on an active RRC connection or a UE context saved at source AP1 122 when the UE is in a connected mode. In an aspect, handover manager 124 may include a connection identifying component 161 to perform this function.

In an aspect, at block 820, methodology 800 may include retrieving, at the first AP, a second cell-radio network temporary identifier (C-RNTI) assigned to the UE by a second AP. For example, in an aspect source AP1 122 and/or handover manager 124 may include a specially programmed processor module, or a processor executing specially programmed code stored in a memory, to retrieve a second C-RNTI assigned to the UE by the target AP2 132. In an aspect, for instance, the C-RNTI may be retrieved from a "target eNB to source eNB transparent container" IE present in the a handover command message received from MME 150, as described above in reference to operation 424 of FIG. 4. In an aspect, handover manager 124 may include a UE information retrieving component 167 to perform this function.

In an aspect, at block 830, methodology 800 may include storing, at the first AP, the second C-RNTI, a second physical cell identity (PCI) of the second AP, and a second evolved universal terrestrial access network (E-UTRAN) cell global identifier (ECGI) of the second AP. For example, in an aspect source AP1 122 and/or handover manager 124 may include a specially programmed processor module, or a processor executing specially programmed code stored in a memory, to store the retrieved C-RNTI, PCI of target AP2 132, and/or an E-CGI of target AP2 132. In an aspect, handover manager 124 may include UE information retrieving component 167 to perform this function.

In an aspect, at block 840, methodology 800 may include marking, at the first AP, handover of the UE as successful based at least on a C-RNTI stored at the first AP, as successful. For example, in an aspect source AP1 122 and/or handover manager 124 may include a specially programmed processor module, or a processor executing specially programmed code stored in a memory, to mark handover of UE 102 as successful based at least on C-RNTI stored at source AP1 122. In an aspect, the handover may be marked as successful if the UE context release command message is received with a cause value of successful handover, as described above in reference to operation 438 of FIG. 4. In an aspect, handover manager 124 may include a handover success identifying component 168 to perform this function.

In an aspect, at block 850, methodology 800 may include receiving, at the first AP, a RRC connection re-establishment request message from the UE, wherein the RRC connection re-establishment request message received from the UE includes one or more of a first C-RNTI of the UE, a first PCI of the target cell, or a re-establishment cause. For example, in an aspect source AP1 122 and/or handover manager 124 may include a specially programmed processor module, or a processor executing specially programmed code stored in a memory, to receive a RRC connection re-establishment request message from UE 102 wherein the RRC connection re-establishment request message received from the UE includes one or more of a C-RNTI of the UE, PCI of the target cell, or a re-establishment cause, as described in reference to operation 440 of FIG. 4. In an aspect, handover manager 124 may include RRC connection reconfiguration component 166 to perform this function.

In an aspect, at block 860, methodology 800 may include determining, at the first AP, a too early-handover of the UE to the first AP based at least on matching of the first PCI received in the RRC connection re-establishment request message with the second PCI stored at the first AP; matching of the first C-RNTI received in the RRC connection re-establishment request message with the second C-RNTI stored at the first AP; and detecting elapsed time from receiving of the UE context release command to receiving of the RRC connection re-establishment request message is less than a certain threshold, described above in reference to operation 442 of FIG. 4. For example, in an aspect source AP1 122 and/or handover manager 124 may include a specially programmed processor module, or a processor executing specially programmed code stored in a memory, to determine a too-early handover of UE 102 to target AP2 132 based at least on matching of PCI and/or C-RNTI and/or elapsed time from receiving of UE context release command as described above in reference to operation 442 of FIG. 4. In an aspect, handover manager 124 may include handover failure detecting component 163 to perform this function.

In an aspect, at block 870, methodology 800 may include modifying, at the first AP, one or more parameters in response to detecting the handover over failure. For example, in an aspect source AP1 122 and/or handover manager 124 may include a specially programmed processor module, or a processor executing specially programmed code stored in a memory, to modify one or more parameters in response to detecting the handover over failure. In an aspect, handover manager 124 may include parameter modifying component 164 to perform this function.

In an aspect, AP1 122 and/or handover manager 124 may modify mobility parameters to reduce (e.g., minimize, avoid, etc.) handover failures. In an aspect, AP1 122 may modify (e.g., increase) mobility parameters, e.g., a3-offset, TimeToTrigger (TTT), event thresholds (e.g., A5Threshold1/2, frequency offset, cell individual offset (CIO), etc. In an additional aspect, source AP1 122 and/or handover manager 124 may change transmit power of AP1 122 or operating channel or frequency of AP1 122 to a different channel or a frequency. In a further additional or optional aspect, AP1 122 and/or handover manager 124 may tag (e.g., identify) certain neighbor APs as not a good handover candidate. In other words, AP1 122 may blacklist some neighbor APs as not suitable for handovers. In an aspect, handover manager 124 may include a connection identifying component 161 to perform this function. Thus, handover failures may be detected and managed at AP1 122.

Figure 9:
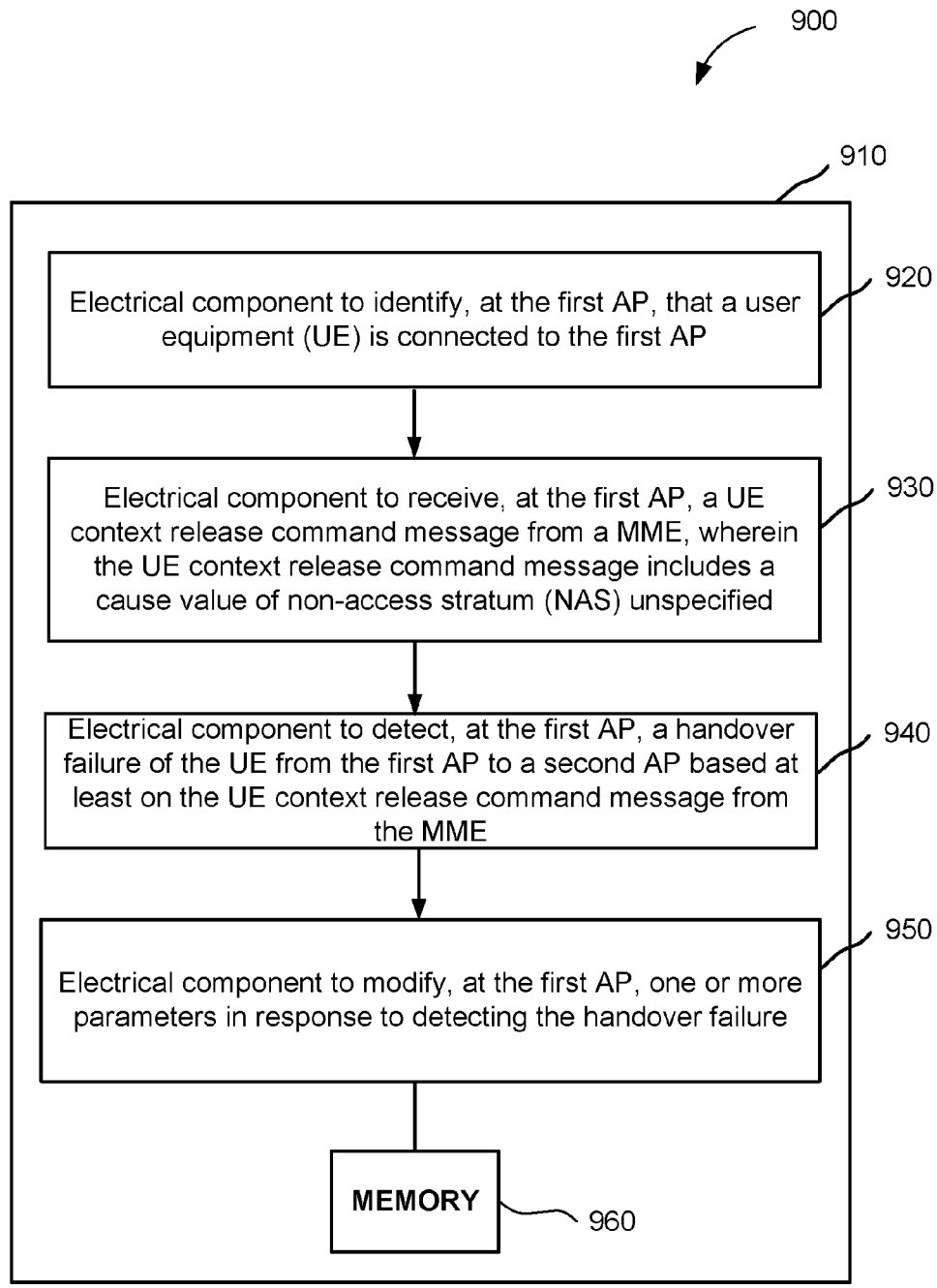
FIGS. 9-11 illustrate example systems for detecting handover failures at an access point, in accordance with aspects of the present disclosure.

Referring to FIG. 9, an example system 900 is displayed for detecting handover failures at an AP.

For example, system 900 can reside at least partially within a cell, for example, source AP 122 (FIG. 1) and/or handover manager 124 (FIG. 1). It is to be appreciated that system 900 is represented as including functional blocks, which can be functional blocks that represent functions implemented by a processor, software, or combination thereof (for example, firmware). System 900 includes a logical grouping 910 of electrical components that can act in conjunction.

For instance, logical grouping 910 may include an electrical component 920 to identify, at the first AP, that a user equipment (UE) is connected to the first AP. For example, in an aspect, electrical component 910 may comprise handover manager 124 and/or a connection identifying component 161.

For instance, logical grouping 910 may include an electrical component 930 to receive, at the first AP, a UE context release command message from a mobile management entity (MME). For example, in an aspect, electrical component 910 may comprise handover manager 124 and/or a UE context release command receiving component 162.

For instance, logical grouping 910 may include an electrical component 940 to detect, at the first AP, a handover failure of the UE from the first AP to a second AP based at least on the UE context release command message from the MME. For example, in an aspect, electrical component 910 may comprise handover manager 124 and/or a handover failure detecting component 163.

For instance, logical grouping 910 may include an electrical component 950 to modify, at the first AP, one or more parameters in response to detecting the handover over failure. For example, in an aspect, electrical component 910 may comprise handover manager 124 and/or a parameter modifying component 164.

Additionally, system 900 may include a memory 960 that retains instructions for executing functions associated with the electrical components 920, 930, 940, and/or 950, and/or stores data used or obtained by the electrical components 920, 930, 940, and/or 950, etc. While shown as being external to memory 960, it is to be understood that one or more of the electrical components 920, 930, 940, and/or 950 may exist within memory 960. In one example, electrical components 920, 930, 940, and/or 950 may comprise at least one processor, or each electrical component 920, 930, 940, and/or 950 may be a corresponding module of at least one processor. Moreover, in an additional or alternative example, electrical components 920, 930, 940, and/or 950 may be a computer readable medium storing computer executable code, where each electrical component 920, 930, 940, and/or 950 may be corresponding code.

Figure 10:
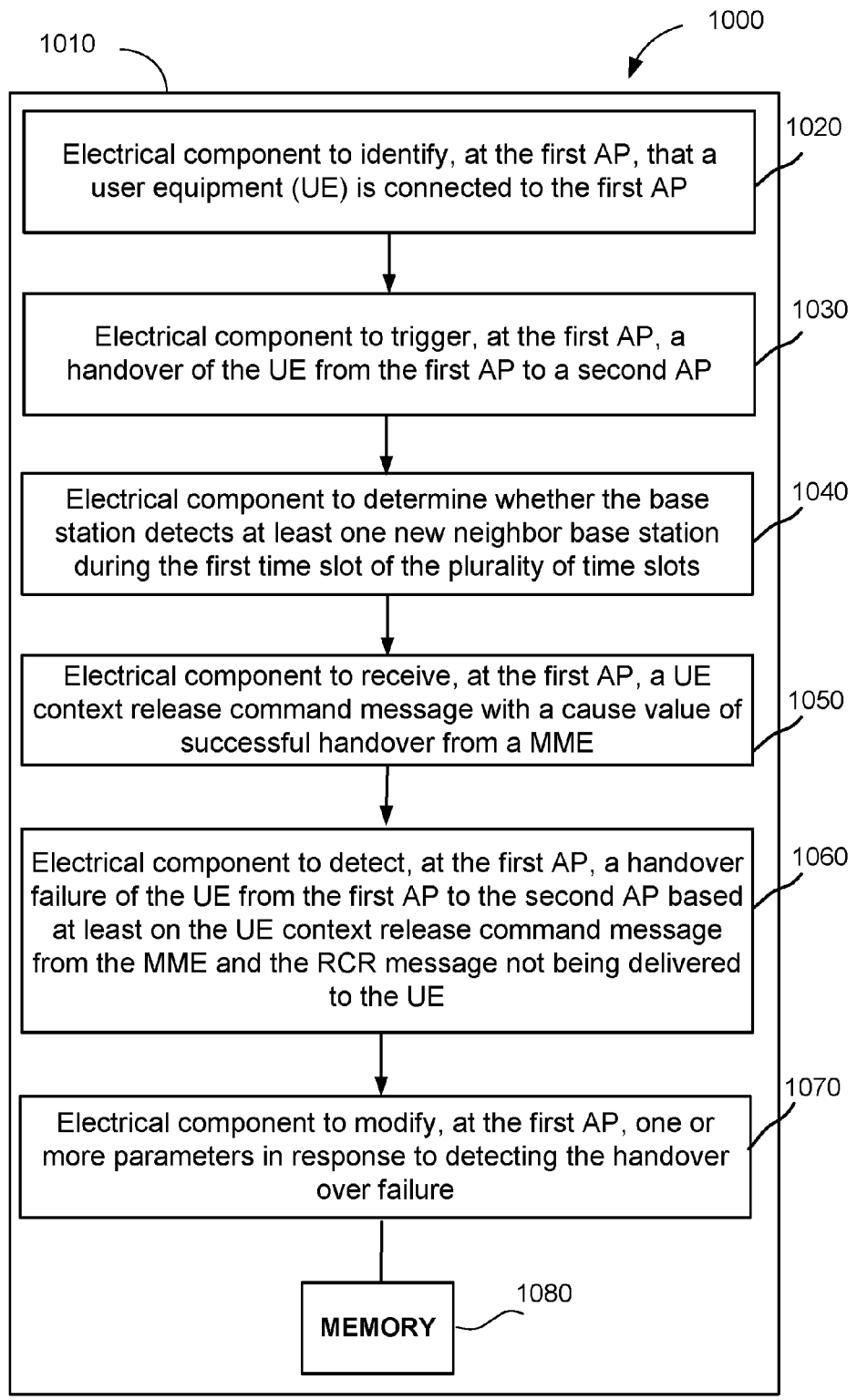

Referring to FIG. 10, an example system 1000 is displayed for detecting handover failures at an AP.

For example, system 1000 can reside at least partially within a cell, for example, source AP1 122 and/or handover manager 124 (FIG. 1). It is to be appreciated that system 1000 is represented as including functional blocks, which can be functional blocks that represent functions implemented by a processor, software, or combination thereof (for example, firmware). System 1000 includes a logical grouping 1010 of electrical components that can act in conjunction.

For instance, logical grouping 1010 may include an electrical component 1020 to identify, at the first AP, that a user equipment (UE) is connected to the first AP. For example, in an aspect, electrical component 1020 may comprise handover manager 124 and/or connection identifying component 161.

For instance, logical grouping 1010 may include an electrical component 1030 to trigger, at the first AP, a handover of the UE from the first AP to a second AP. For example, in an aspect, electrical component 910 may comprise handover manager 124 and/or a handover triggering component 165.

For instance, logical grouping 1010 may include an electrical component 1040 to determine, at the first AP, that a radio resource control (RRC) connection reconfiguration (RCR) message is not delivered to the UE. For example, in an aspect, electrical component 910 may comprise handover manager 124 and/or a RRC connection reconfiguration component 166.

For instance, logical grouping 1010 may include an electrical component 1050 to receive, at the first AP, a user equipment (UE) context release command message with a cause value of successful handover from a mobile management entity (MME) and the RCR not being delivered to the UE. For example, in an aspect, electrical component 1010 may comprise handover manager 124 and/or UE context release command receiving component 162.

For instance, logical grouping 1010 may include an electrical component 1060 to detect, at the first AP, a handover failure of the UE from the first AP to the second AP based at least on the UE context release command message from the MME. For example, in an aspect, electrical component 910 may comprise handover manager 124 and/or the handover failure detecting component 163.

For instance, logical grouping 1010 may include an electrical component 1070 to modify, at the first AP, one or more parameters in response to detecting the handover over failure. For example, in an aspect, electrical component 910 may comprise handover manager 124 and/or parameter modifying component 164.

Additionally, system 1000 can include a memory 1080 that retains instructions for executing functions associated with the electrical components 1020, 1030, 1040, 1050, 1060, and/or 1070, stores data used or obtained by the electrical components 1020, 1030, 1040, 1050, 1060, and/or 1070, etc. While shown as being external to memory 1080, it is to be understood that one or more of the electrical components 1020, 1030, 1040, 1050, 1060, and/or 1070 can exist within memory 1080. In one example, electrical components 1020, 1030, 1040, 1050, 1060, and/or 1070 can comprise at least one processor, or each electrical component 1020, 1030, 1040, 1050, 1060, and/or 1070 can be a corresponding module of at least one processor. Moreover, in an additional or alternative example, electrical components 1020, 1030, 1040, 1050, 1060, and/or 1070 can be a computer program product including a computer readable medium, where each electrical component 1020, 1030, 1040, 1050, 1060, and/or 1070 can be corresponding code.

Figure 11:
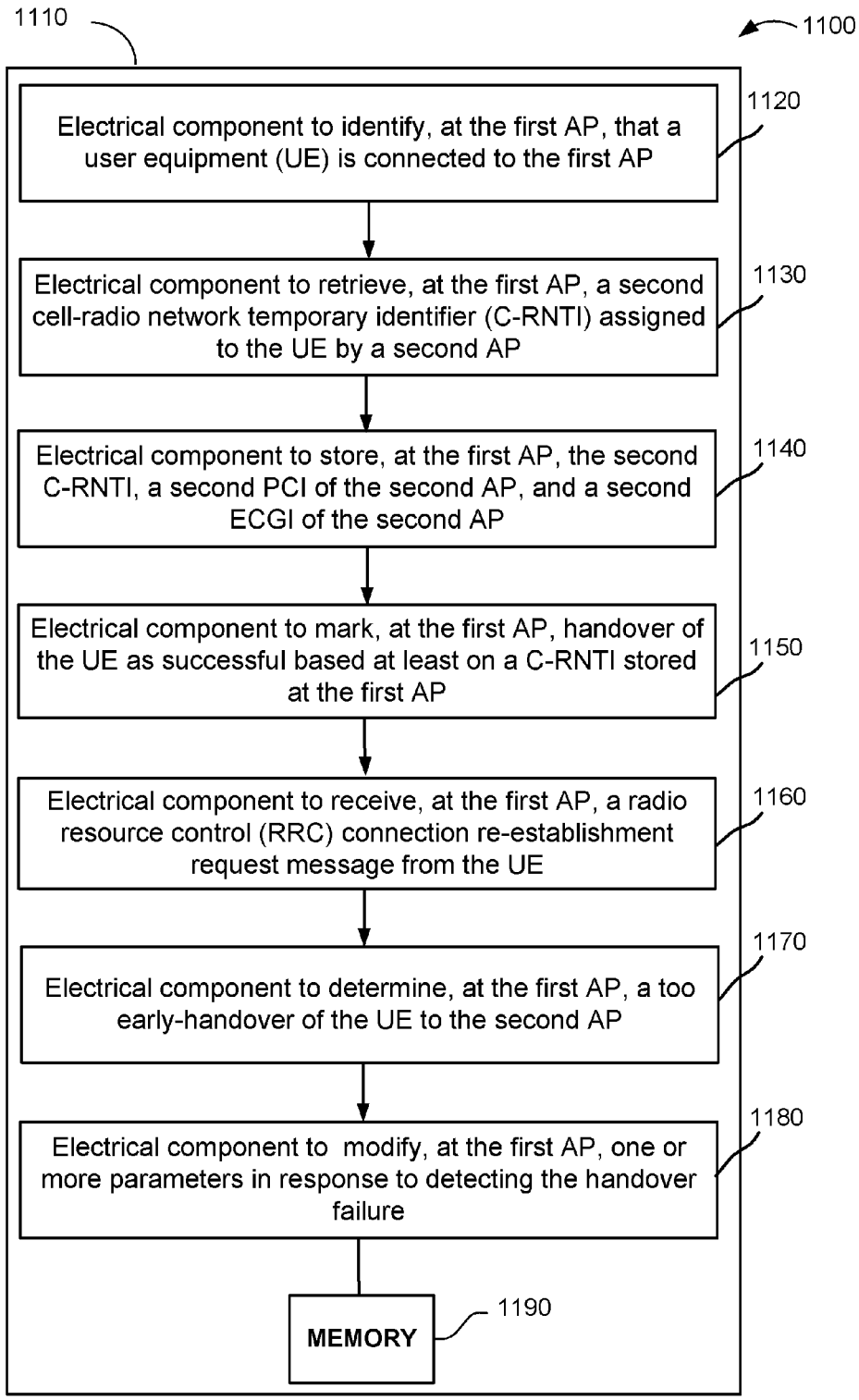

Referring to FIG. 11, an example system 1100 is displayed for detecting handover failures at an AP.

For example, system 1100 can reside at least partially within a cell, for example, source AP 122 (FIG. 1) and/or handover manager 124 (FIG. 1). It is to be appreciated that system 1100 is represented as including functional blocks, which can be functional blocks that represent functions implemented by a processor, software, or combination thereof (for example, firmware). System 1100 includes a logical grouping 1110 of electrical components that can act in conjunction.

For instance, logical grouping 1110 may include an electrical component 1120 to identify, at a first AP, that a user equipment (UE) is connected to the first AP. For example, in an aspect, electrical component 1110 may comprise handover manager 124 and/or connection identifying component 161.

For instance, logical grouping 1110 may include an electrical component 1130 to retrieving, at the first AP, a second cell-radio network temporary identifier (C-RNTI) assigned to the UE by a second AP. For example, in an aspect, electrical component 1110 may comprise handover manager 124 and/or UE information retrieving component 167.

For instance, logical grouping 1110 may include an electrical component 1140 to store, at the first AP, the second C-RNTI, a second physical cell identity (PCI) of the second AP, and a second evolved universal terrestrial access network (E-UTRAN) cell global identifier (ECGI) of the second AP. For example, in an aspect, electrical component 1110 may comprise handover manager 124 and/or UE information retrieving component 167.

For instance, logical grouping 1110 may include an electrical component 1150 to mark, at the first AP, handover of the UE as successful based at least on a C-RNTI stored at the first AP, as successful. For example, in an aspect, electrical component 1110 may comprise handover manager 124 and/or handover success identifying component 168.

For instance, logical grouping 1110 may include an electrical component 1160 to receive, at the first AP, a RRC connection re-establishment request message from the UE, wherein the RRC connection re-establishment request message received from the UE includes one or more of a first C-RNTI of the UE, a first PCI of the target cell, or a re-establishment cause. For example, in an aspect, electrical component 1110 may comprise handover manager 124 and/or RRC connection re-establishment component 169.

For instance, logical grouping 1110 may include an electrical component 1170 to determine, at the first AP, a too early-handover of the UE to the second AP based at least on matching C-RNTI, PCI, and elapsed time duration values. For example, in an aspect, electrical component 1110 may comprise handover manager 124 and/or handover failure detecting component 163.

For instance, logical grouping 1010 may include an electrical component 1180 to modify, at the first AP, one or more parameters in response to detecting the handover over failure. For example, in an aspect, electrical component 910 may comprise handover manager 124 and/or parameter modifying component 164.

Additionally, system 1100 can include a memory 1190 that retains instructions for executing functions associated with the electrical components 1120, 1130, 1140, 1150, 1160, 1170, and/or 1180, stores data used or obtained by the electrical components 1120, 1130, 1140, 1150, 1160, 1170, and/or 1180. While shown as being external to memory 1190, it is to be understood that one or more of the electrical components 1120, 1130, 1140, 1150, 1160, 1170, and/or 1180 can exist within memory 1190. In one example, electrical components 1120, 1130, 1140, 1150, 1160, 1170, and/or 1180 can comprise at least one processor, or each electrical component 1120, 1130, 1140, 1150, 1160, 1170, and/or 1180 can be a corresponding module of at least one processor. Moreover, in an additional or alternative example, electrical components 1120, 1130, 1140, 1150, 1160, 1170, and/or 1180 can be a computer program product including a computer readable medium, where each electrical component 1120, 1130, 1140, 1150, 1160, 1170, and/or 1180 can be corresponding code.

Figure 12:
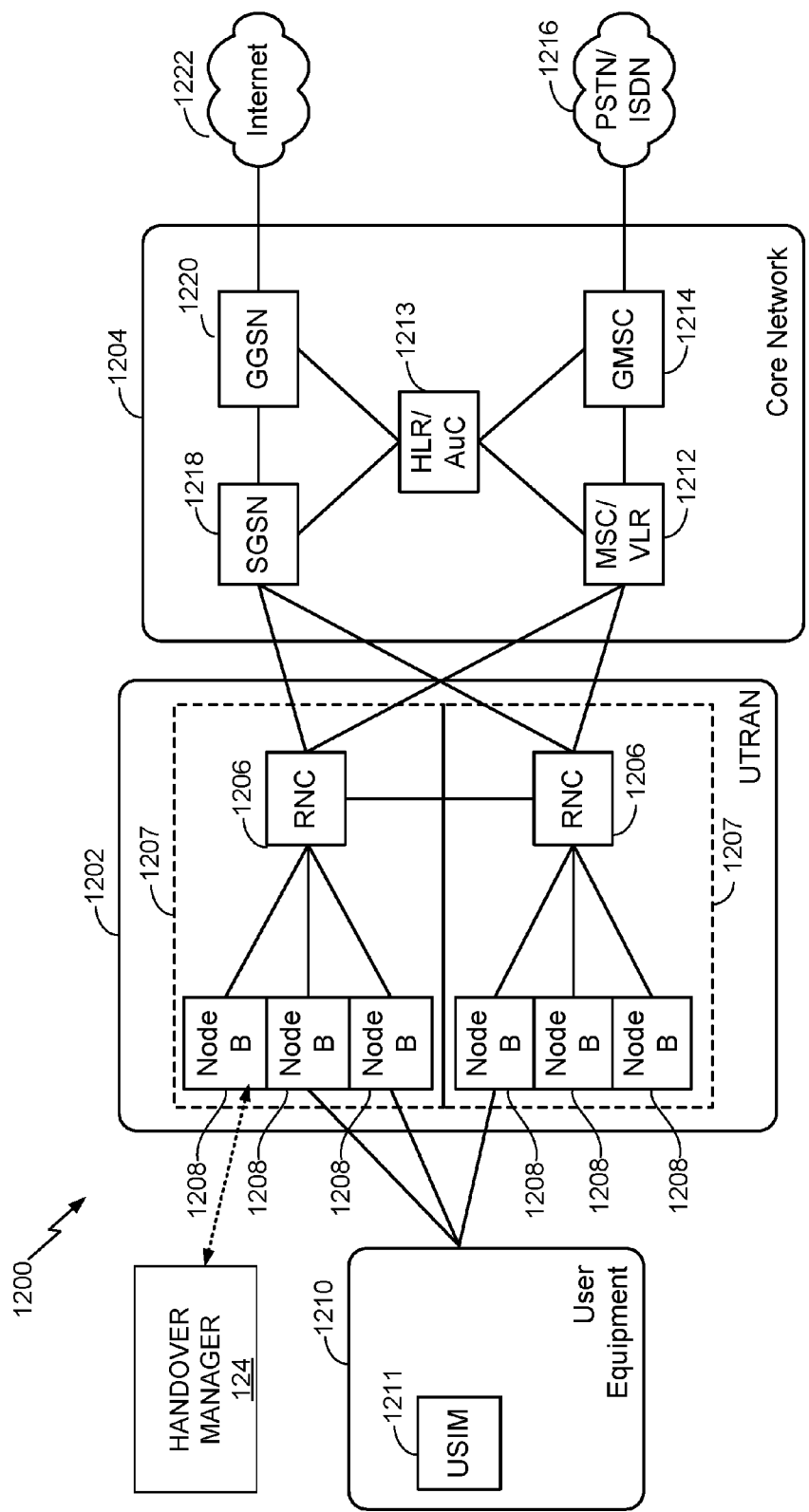
FIG. 12 is a block diagram conceptually illustrating an example of a telecommunications system, including aspects of the system of FIG. 1.

FIG. 12 is a block diagram conceptually illustrating an example of a telecommunications system, including aspects of the system of FIG. 1. By way of example and without limitation, the aspects of the present disclosure illustrated in FIG. 12 are presented with reference to a UMTS system 1200 employing a W-CDMA air interface and may include AP 122 executing an aspect of handover manager 124 (FIG. 1), and/or APs 132, 142. The networks described above that include APs having a handover manager 124 may be part of or may be associated with a system such as UMTS system 1200. A UMTS network includes three interacting domains: a Core Network (CN) 1204, a UMTS Terrestrial Radio Access Network (UTRAN) 1202 which may include NodeB 1208 (which may be an example of APs 122, 132, and/or 142) and User Equipment (UE) 1210 (which may be an example of UE 102 of FIG. 1). In this example, the UTRAN 1202 provides various wireless services including telephony, video, data, messaging, broadcasts, and/or other services. The UTRAN 1202 may include a plurality of Radio Network Subsystems (RNSs) such as an RNS 1207, each controlled by a respective Radio Network Controller (RNC) such as an RNC 1206. Here, the UTRAN 1202 may include any number of RNCs 1206 and RNSs 1207 in addition to the RNCs 1206 and RNSs 1207 illustrated herein. The RNC 1206 is an apparatus responsible for, among other things, assigning, reconfiguring and releasing radio resources within the RNS 1207. The RNC 1206 may be interconnected to other RNCs (not shown) in the UTRAN 1202 through various types of interfaces such as a direct physical connection, a virtual network, or the like, using any suitable transport network.

Communication between a UE 1210 and a NodeB 1208 may be considered as including a physical (PHY) layer and a medium access control (MAC) layer. Further, communication between a UE 1210 and an RNC 1206 by way of a respective NodeB 1208 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in Radio Resource Control (RRC) Protocol Specification, 3GPP TS 25.331 v9.1.0, incorporated herein by reference.

The geographic region covered by the SRNS 1207 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three NodeBs 1208 are shown in each SRNS 1207; however, the SRNSs 1207 may include any number of wireless NodeBs. The NodeBs 1208 provide wireless access points to a core network (CN) 1204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 1210 may further include a universal subscriber identity module (USIM) 1211, which contains a user's subscription information to a network. For illustrative purposes, one UE 1210 is shown in communication with a number of the NodeBs 1208. The downlink (DL), also called the forward link, refers to the communication link from a NodeB 1208 to a UE 1210, and the uplink (UL), also called the reverse link, refers to the communication link from a UE 1210 to a NodeB 1208.

The core network 1204 interfaces with one or more access networks, such as the UTRAN 1202. As shown, the core network 1204 is a GSM core network. However, as those skilled in the art will recognize, the various concepts presented throughout this disclosure may be implemented in a RAN, or other suitable access network, to provide UEs with access to types of core networks other than GSM networks.

The core network 1204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 1204 supports circuit-switched services with a MSC 1212 and a GMSC 1214. In some applications, the GMSC 1214 may be referred to as a media gateway (MGW). One or more RNCs, such as the RNC 1206, may be connected to the MSC 1212. The MSC 1212 is an apparatus that controls call setup, call routing, and UE mobility functions. The MSC 1212 also includes a visitor location register (VLR) that contains subscriber-related information for the duration that a UE is in the coverage area of the MSC 1212. The GMSC 1214 provides a gateway through the MSC 1212 for the UE to access a circuit-switched network 1216. The core network 1204 includes a home location register (HLR) 1213 containing subscriber data, such as the data reflecting the details of the services to which a particular user has subscribed. The HLR is also associated with an authentication center (AuC) that contains subscriber-specific authentication data. When a call is received for a particular UE, the GMSC 1214 queries the HLR 1213 to determine the UE's location and forwards the call to the particular MSC serving that location.

The core network 1204 also supports packet-data services with a serving GPRS support node (SGSN) 1218 and a gateway GPRS support node (GGSN) 1220. GPRS, which stands for General Packet Radio Service, is designed to provide packet-data services at speeds higher than those available with standard circuit-switched data services. The GGSN 1220 provides a connection for the UTRAN 1202 to a packet-based network 1222. The packet-based network 1222 may be the Internet, a private data network, or some other suitable packet-based network. The primary function of the GGSN 1220 is to provide the UEs 1210 with packet-based network connectivity. Data packets may be transferred between the GGSN 1220 and the UEs 1210 through the SGSN 1218, which performs primarily the same functions in the packet-based domain as the MSC 1212 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a NodeB 1208 and a UE 1210. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 13:
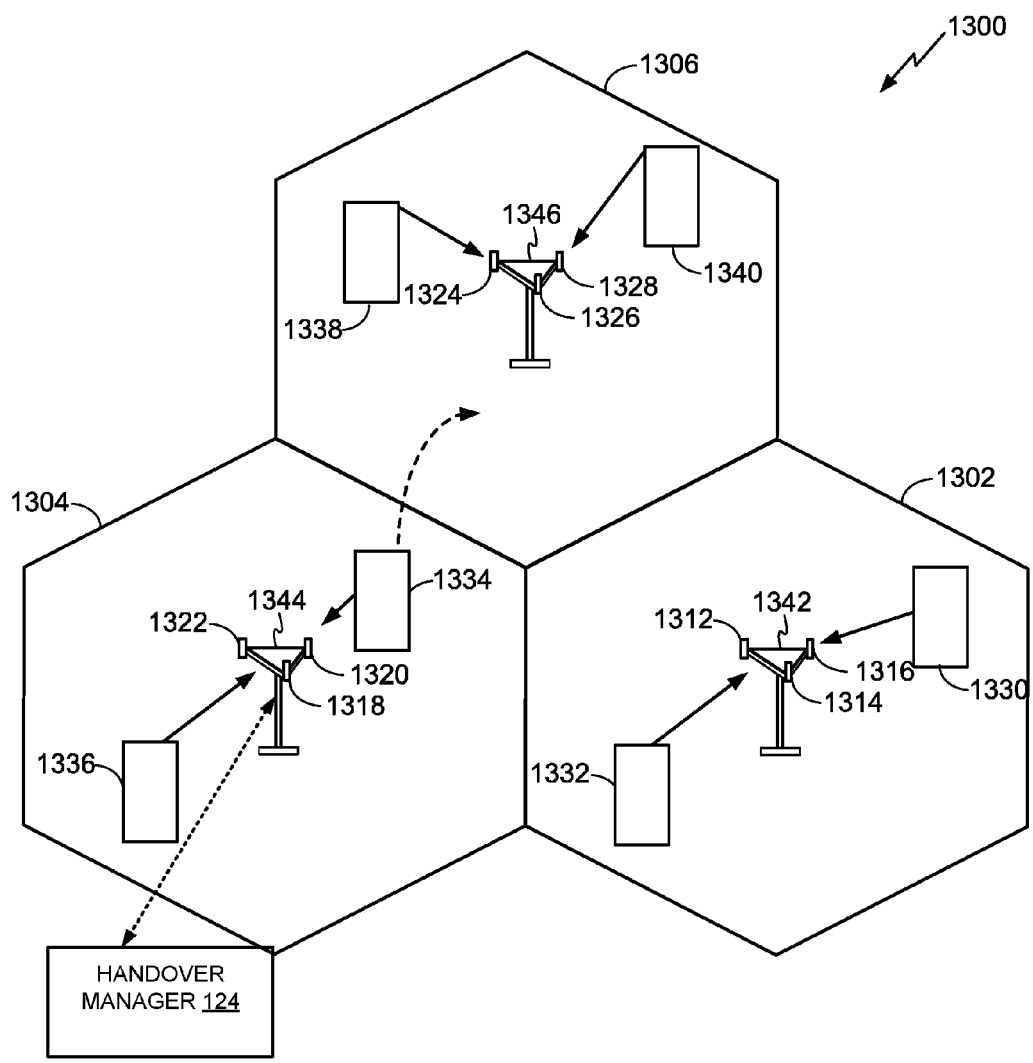
FIG. 13 is a conceptual diagram illustrating an example of an access network for use with a UE, in accordance with an aspect of the present disclosure.

Referring to FIG. 13, an access network 1300 in UTRAN architecture is illustrated, and may include cells 1302, 1304, and 1306, which be the same as or similar to AP 122 (FIG. 1) in that it is configured to include handover manager 124 (FIG. 13; for example, illustrated here as being associated with cell 1304 for detecting handover failures) and/or APs 132, 142. The multiple sectors can be formed by groups of antennas with each antenna responsible for communication with UEs in a portion of the cell. For example, in cell 1302, antenna groups 1312, 1314, and 1316 may each correspond to a different sector. In cell 1304, antenna groups 1318, 1320, and 1322 each correspond to a different sector. In cell 1306, antenna groups 1324, 1326, and 1328 each correspond to a different sector. The cells 1302, 1304 and 1306 may include several wireless communication devices, e.g., User Equipment or UEs, which may be in communication with one or more sectors of each cell 1302, 1304 or 1306. For example, UEs 1330 and 1332 may be in communication with NodeB 1342, UEs 1334 and 1336 may be in communication with NodeB 1344, and UEs 1338 and 1340 can be in communication with NodeB 1346. Here, each NodeB 1342, 1344, 1346 is configured to provide an access point to a CN 1204 (see FIG. 12) for all the UEs 1330, 1332, 1334, 1336, 1338, 1340 in the respective cells 1302, 1304, and 1306. UEs 1330, 1332, 1334, 1336, 1338, and 1340 may be similar to UE 102, described above, and NodeBs 1342, 1344, and/or 1346 can correspond to one or more of the macro cells and/or small cells described in, for example, FIG. 1.

As the UE 1334 moves from the illustrated location in cell 1304 into cell 1306, a serving cell change (SCC) or handover may occur in which communication with the UE 1334 transitions from the cell 1304, which may be referred to as the source cell (e.g., source AP1 122), to cell 1306, which may be referred to as the target cell (e.g., target AP2 132 or target AP2 142). Management of the handover procedure may take place at the UE 1334, at the NodeBs corresponding to the respective cells, at a radio network controller 1206 (see FIG. 12), or at another suitable node in the wireless network. For example, during a call with the source cell 1304, or at any other time, the UE 1334 may monitor various parameters of the source cell 1304 as well as various parameters of neighboring cells such as cells 1306 and 1302. Further, depending on the quality of these parameters, the UE 1334 may maintain communication with one or more of the neighboring cells. During this time, the UE 1334 may maintain an Active Set, that is, a list of cells that the UE 1334 is simultaneously connected to (i.e., the UTRA cells that are currently assigning a downlink dedicated physical channel (DPCH) or fractional downlink dedicated physical channel (F-DPCH) to the UE 1334 may constitute the Active Set).

The modulation and multiple access scheme employed by the access network 1300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 14:
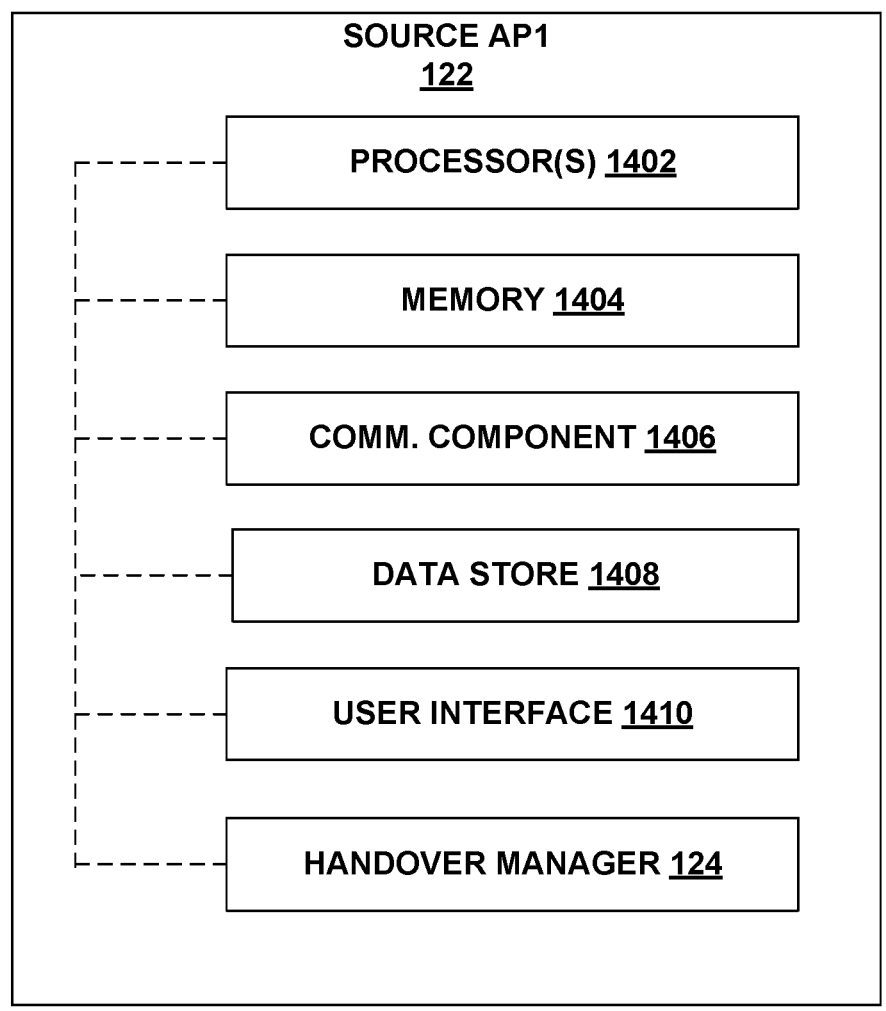
FIG. 14 is a block diagram conceptually illustrating an example hardware implementation for an apparatus employing a processing system configured in accordance with an aspect of the present disclosure.

Referring to FIG. 14, in an aspect, source AP1 122, for example, including handover manager 124, may be or may include a specially programmed or configured computer device to perform the functions described herein. In one aspect of implementation, source AP1 122 may include one or more of the following components: a connection identifying component 161, a UE context release command receiving component 162, a handover failure detecting component 163, a parameter modifying component 164, a handover triggering component 165, or a RRC connection reconfiguration component 166, a UE information retrieving component 167, a handover success identifying component 168, and/or RRC connection re-establishment component 169, such as in specially programmed computer readable instructions or code, firmware, hardware, or some combination thereof.

In an aspect, for example as represented by the dashed lines, handover manager 124 may be implemented in or executed using one or any combination of processor 1402, memory 1404, communications component 1406, and data store 1408. For example, handover manager 124 may be executed on one or more processors 1402. Further, for example, handover manager 124 may be defined as a computer-readable medium stored in memory 1404 and/or data store 1408 and executed by processor 1402. Moreover, for example, inputs and outputs relating to operations of handover manager 124 may be provided or supported by communications component 1406, which may provide a bus between the components of computer device 1400 or an interface for communication with external devices or components.

Source AP1 122 may include processor 1402 specially configured to carry out processing functions associated with one or more of components and functions described herein. Processor 1402 can include a single or multiple set of processors or multi-core processors. Moreover, processor 1402 can be implemented as an integrated processing system and/or a distributed processing system.

Source AP1 122 further includes memory 1404, such as for storing data used herein and/or local versions of applications and/or instructions or code being executed by processor 1402, such as to perform the respective functions of the respective entities described herein. Memory 1404 can include any type of memory usable by a computer, such as random access memory (RAM), read only memory (ROM), tapes, magnetic discs, optical discs, volatile memory, non-volatile memory, and any combination thereof.

Further, Source AP1 122 includes communications component 1406 that provides for establishing and maintaining communications with one or more parties utilizing hardware, software, and services as described herein. Communications component 1406 may carry communications between components on source AP1 122, as well as between user and external devices, such as devices located across a communications network and/or devices serially or locally connected to source AP1 122. For example, communications component 1406 may include one or more buses, and may further include transmit chain components and receive chain components associated with a transmitter and receiver, respectively, or a transceiver, operable for interfacing with external devices.

Additionally, source AP1 122 may further include data store 1408, which can be any suitable combination of hardware and/or software, that provides for mass storage of information, databases, and programs employed in connection with aspects described herein. For example, data store 1408 may be a data repository for applications not currently being executed by processor 1402.

Source AP1 122 may additionally include a user interface component 1410 operable to receive inputs from a user of source AP1 122, and further operable to generate outputs for presentation to the user. User interface component 1410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1410 may include one or more output devices, including but not limited to a display, a speaker, a haptic feedback mechanism, a printer, any other mechanism capable of presenting an output to a user, or any combination thereof.

The various concepts presented throughout this disclosure may be implemented across a broad variety of telecommunication systems, network architectures, and communication standards.

Figure 15:
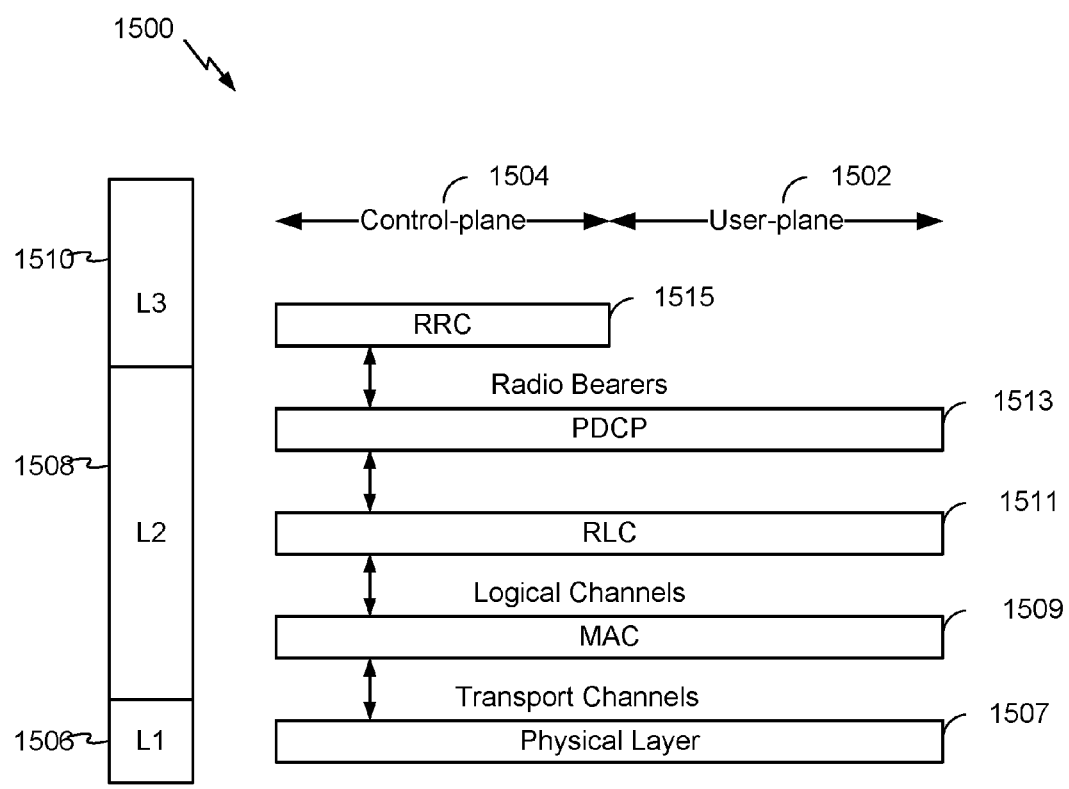
FIG. 15 is a conceptual diagram illustrating an example of a radio protocol architecture for the user and control planes for a base station and/or a UE, in accordance with an aspect of the present disclosure.

FIG. 15 is a conceptual diagram illustrating an example of the radio protocol architecture 1500 for the user plane 1502 and the control plane 1504 of an AP/NodeB/base station or a UE. The architecture 1500 may be used with the networks described herein that include AP 122 having a handover manager 124, and/or APs 132, 142. For example, architecture 1500 may be included in a network entity and/or UE such as the ones described in FIGS. 1 and 12-14. The radio protocol architecture 1500 for the AP and the UE is shown with three layers: Layer 1 1506, Layer 2 1508, and Layer 3 1510. Layer 1 1506 is the lowest lower and implements various physical layer signal processing functions. As such, Layer 1 1506 includes the physical layer 1507. Layer 2 (L2 layer) 1508 is above the physical layer 1507 and is responsible for the link between the AP and UE over the physical layer 1507. Layer 3 (L3 layer) 1510 includes a radio resource control (RRC) sublayer 1515. The RRC sublayer 1515 handles the control plane signaling of Layer 3 between the UE and the UTRAN.

In the user plane, the L2 layer 1508 includes a media access control (MAC) sublayer 1509, a radio link control (RLC) sublayer 1511, and a packet data convergence protocol (PDCP) 1513 sublayer, which are terminated at the AP on the network side. Although not shown, the UE may have several upper layers above the L2 layer 1508 including a network layer (e.g., IP layer) that is terminated at a PDN gateway on the network side, and an application layer that is terminated at the other end of the connection (e.g., far end UE, server, etc.).

The PDCP sublayer 1513 provides multiplexing between different radio bearers and logical channels. The PDCP sublayer 1513 also provides header compression for upper layer data packets to reduce radio transmission overhead, security by ciphering the data packets, and handover support for UEs between NodeBs. The RLC sublayer 1511 provides segmentation and reassembly of upper layer data packets, retransmission of lost data packets, and reordering of data packets to compensate for out-of-order reception due to hybrid automatic repeat request (HARQ). The MAC sublayer 1509 provides multiplexing between logical and transport channels. The MAC sublayer 1509 is also responsible for allocating the various radio resources (e.g., resource blocks) in one cell among the UEs. The MAC sublayer 1509 is also responsible for HARQ operations.

Figure 16:
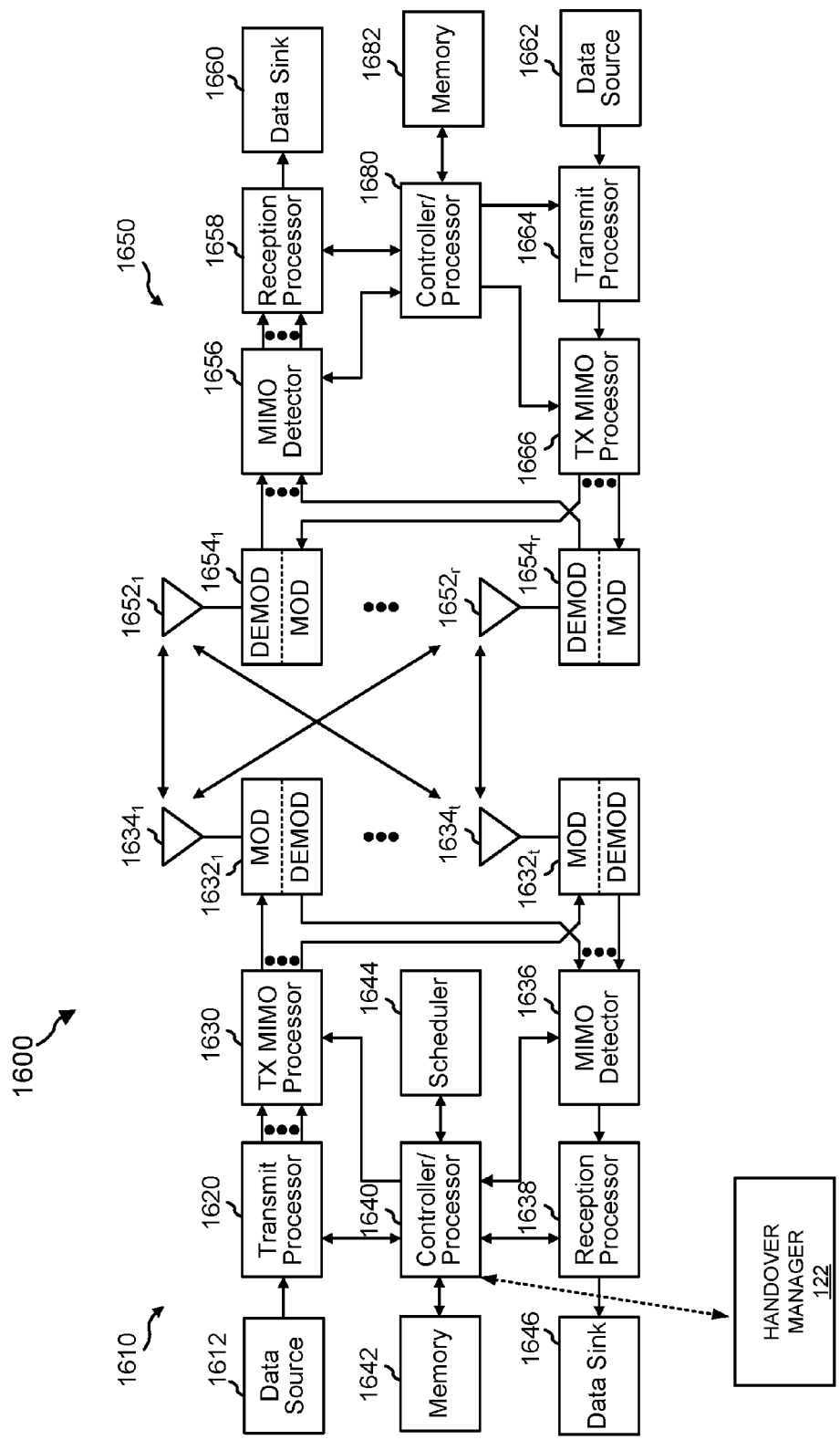
FIG. 16 is a block diagram conceptually illustrating examples of an eNodeB and a UE configured in accordance with an aspect of the present disclosure.

FIG. 16 is a block diagram 1600 conceptually illustrating examples of an eNodeB 1610 and a UE 1650 configured in accordance with an aspect of the present disclosure, wherein the eNodeB may be source AP1 122 (e.g., configured to include a handover manager 124), and/or target APs 132 and/or 142. For example, the base station/eNodeB 1610 and the UE 1650 of a system 1600, as shown in FIG. 16, may be one of the APs and one of the UEs in FIGS. 1-4. The base station 1610 may be equipped with antennas $1634_{1-t}$, and the UE 1650 may be equipped with antennas $1652_{1-r}$, wherein t and r are integers greater than or equal to one.

At the base station 1610, a base station transmit processor 1620 may receive data from a base station data source 1612 and control information from a base station controller/processor 1640. The control information may be carried on the PBCH, PCFICH, PHICH, PDCCH, etc. The data may be carried on the PDSCH, etc. The base station transmit processor 1620 may process (e.g., encode and symbol map) the data and control information to obtain data symbols and control symbols, respectively. The base station transmit processor 1620 may also generate reference symbols, e.g., for the PSS, SSS, and cell-specific reference signal (RS). A base station transmit (TX) multiple-input multiple-output (MIMO) processor 1630 may perform spatial processing (e.g., precoding) on the data symbols, the control symbols, and/or the reference symbols, if applicable, and may provide output symbol streams to the base station modulators/demodulators (MODs/DEMODs) $1632_{1-t}$. Each base station modulator/demodulator 1632 may process a respective output symbol stream (e.g., for OFDM, etc.) to obtain an output sample stream. Each base station modulator/demodulator 1632 may further process (e.g., convert to analog, amplify, filter, and upconvert) the output sample stream to obtain a downlink signal. Downlink signals from modulators/demodulators $1632_{1-t}$ may be transmitted via the antennas $1634_{1-t}$, respectively.

At the UE 1650, the UE antennas $1652_{1-r}$ may receive the downlink signals from the base station 1610 and may provide received signals to the UE modulators/demodulators (MODs/DEMODs) $1654_{1-r}$, respectively. Each UE modulator/demodulator 1654 may condition (e.g., filter, amplify, downconvert, and digitize) a respective received signal to obtain input samples. Each UE modulator/demodulator 1654 may further process the input samples (e.g., for OFDM, etc.) to obtain received symbols. A UE MIMO detector 1656 may obtain received symbols from all the UE modulators/demodulators $1654_{1-r}$, and perform MIMO detection on the received symbols if applicable, and provide detected symbols. A UE reception processor 1658 may process (e.g., demodulate, deinterleave, and decode) the detected symbols, provide decoded data for the UE 1650 to a UE data sink 1660, and provide decoded control information to a UE controller/processor 1680.

On the uplink, at the UE 1650, a UE transmit processor 1664 may receive and process data (e.g., for the PUSCH) from a UE data source 1662 and control information (e.g., for the PUCCH) from the UE controller/processor 1680. The UE transmit processor 1664 may also generate reference symbols for a reference signal. The symbols from the UE transmit processor 1664 may be precoded by a UE TX MIMO processor 1666 if applicable, further processed by the UE modulator/demodulators $1654_{1-r}$ (e.g., for SC-FDM, etc.), and transmitted to the base station 1610. At the base station 1610, the uplink signals from the UE 1650 may be received by the base station antennas 1634, processed by the base station modulators/demodulators 1632, detected by a base station MIMO detector 1636 if applicable, and further processed by a base station reception processor 1638 to obtain decoded data and control information sent by the UE 1650. The base station reception processor 1638 may provide the decoded data to a base station data sink 1646 and the decoded control information to the base station controller/processor 1640.

The base station controller/processor 1640 and the UE controller/processor 1680 may direct the operation at the base station 1610 and the UE 1650, respectively. The base station controller/processor 1640 and/or other processors and modules at the base station 1610 may perform or direct, e.g., various processes for the techniques described herein (e.g., as illustrated in FIGS. 2-8). The base station memory 1642 and the UE memory 1682 may store data and program codes for the base station 1610 and the UE 1650, respectively. A scheduler 844 may be used to schedule UE 1650 for data transmission on the downlink and/or uplink.

The various concepts presented throughout this disclosure may be implemented across a broad variety of telecommunication systems, network architectures, and communication standards.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm operations described in connection with the disclosure herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of detecting a handover failure at a first access point (AP), comprising:
    identifying, at the first AP, that a user equipment (UE) is connected to the first AP;
    receiving, at the first AP, a UE context release command message from a mobile management entity (MME), wherein the UE context release command message is triggered by the MME in response to receiving an initial non-access stratum (NAS) message from a second AP and includes a cause value of NAS unspecified;
    detecting, at the first AP, a handover failure of the UE from the first AP to the second AP based at least on the UE context release command message from the MME; and
    modifying, at the first AP, one or more parameters in response to detecting the handover failure.

2. The method of claim 1, wherein the one or more parameters comprise one or more mobility parameters, a transmit power, an operating channel or frequency, a list of available neighbor cells, or a combination thereof.

3. The method of claim 1, wherein the handover failure is a too-late handover.

4. The method of claim 1, wherein the UE context release command message with the cause value of NAS unspecified indicates a radio link failure (RLF) with the first AP and a connection established with the second AP.

5. The method of claim 1, wherein the detecting further comprises:
determining, at the first AP, whether the UE context release command message is received within a defined time duration of a last known time the UE was connected to the first AP.

6. The method of claim 5, wherein the defined time duration is determined from one or more of measurement report messages (MRMs), uplink (UL) packets, or UL signals received from the UE.

7. The method of claim 1, further comprising:
receiving, at the first AP, one or more reference signal received power (RSRP) measurements in measurement report messages (MRMs) from the UE;
determining, at the first AP, that the UE failed to experience a coverage gap when at least one RSRP measurement of the one or more RSRP measurements is equal to, or above, a threshold; and
modifying, at the first AP, the one or more parameters in response to determining that the UE failed to experience the coverage gap.

8. The method of claim 7, further comprising:
determining, at the first AP, that the UE experienced the coverage gap when at least one RSRP measurement of the one or more RSRP measurements is below the threshold; and
modifying, at the first AP, a transmission power in response to determining that the UE experienced the coverage gap.

9. The method of claim 1, wherein the first AP does not have an X2 interface with at least one neighbor AP of the first AP.

10. A first access point (AP) for detecting a handover failure, comprising:
a memory; and
at least one processor coupled to the memory and configured to:
identify, at the first AP, that a user equipment (UE) is connected to the first AP;
receive, at the first AP, a UE context release command message from a mobile management entity (MME), wherein the UE context release command message is triggered by the MME in response to receiving an initial non-access stratum (NAS) message from a second AP and includes a cause value of NAS unspecified;
detect, at the first AP, a handover failure of the UE from the first AP to the second AP based at least on the UE context release command message from the MME; and
modify, at the first AP, one or more parameters in response to detecting the handover failure.

11. The first AP of claim 10, wherein the one or more parameters comprises one or more mobility parameters, a transmit power, an operating channel or frequency, a list of available neighbor cells, or a combination thereof.

12. The first AP of claim 10, wherein the handover failure is a too-late handover.

13. The first AP of claim 10, wherein the UE context release command message with the cause value of NAS unspecified indicates a radio link failure (RLF) with the first AP and a connection established with the second AP.

14. The first AP of claim 10, wherein the at least one processor is further configured to:
determine, at the first AP, whether the UE context release command message is received within a defined time duration of a last known time the UE was connected to the first AP.

15. The first AP of claim 14, wherein the at least one processor is further configured to determine the defined time duration from one or more of measurement report messages (MRMs), uplink (UL) packets, or UL signals received from the UE.

16. The first AP of claim 10, wherein the at least one processor is further configured to:
receive, at the first AP, reference signal received power (RSRP) measurements in measurement report messages (MRMs) from the UE;
determine, at the first AP, that the UE failed to experience a coverage gap when at least one RSRP measurement of the one or more RSRP measurements is equal to, or above, a threshold; and
modify, at the first AP, the one or more parameters in response to determining that the UE failed to experience the coverage gap.

17. The first AP of claim 16, wherein the at least one processor is further configured to:
determine, at the first AP, that the UE experienced the coverage gap when the at least one RSRP measurement of the one or more RSRP measurements is below the threshold; and
modify, at the first AP, a transmission power in response to determining that the UE experienced the coverage gap.

18. The first AP of claim 10, wherein the first AP does not have an X2 interface with at least one neighbor AP of the first AP.

* * * * *